US009667943B2

(12) United States Patent
Izawa

(10) Patent No.: US 9,667,943 B2
(45) Date of Patent: May 30, 2017

(54) IMAGE PROCESSING DEVICE, IMAGING DEVICE, IMAGE PROCESSING METHOD, AND COMPUTER READABLE MEDIUM

(71) Applicant: FUJIFILM CORPORATION, Minato-ku, Tokyo (JP)

(72) Inventor: Katsutoshi Izawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 324 days.

(21) Appl. No.: 14/642,777

(22) Filed: Mar. 10, 2015

(65) Prior Publication Data

US 2015/0181196 A1  Jun. 25, 2015

Related U.S. Application Data

(63) Continuation of application No. PCT/JP2013/071182, filed on Aug. 5, 2013.

(30) Foreign Application Priority Data

Sep. 19, 2012 (JP) .................................. 2012-205907

(51) Int. Cl.
  *H04N 15/00* (2006.01)
  *H04N 13/02* (2006.01)
  (Continued)

(52) U.S. Cl.
  CPC .......... *H04N 13/0203* (2013.01); *G03B 13/18* (2013.01); *G03B 35/08* (2013.01);
  (Continued)

(58) Field of Classification Search
  CPC .... G03B 13/18; G03B 35/08; H04N 13/0203; H04N 13/0232; H04N 13/0257;
  (Continued)

(56) References Cited

U.S. PATENT DOCUMENTS

2009/0153693 A1  6/2009 Onuki et al.
2012/0113314 A1  5/2012 Onuki et al.
(Continued)

FOREIGN PATENT DOCUMENTS

JP   2009-086429 A   4/2009
JP   2009-147665 A   7/2009

*Primary Examiner* — Robert Chevalier
(74) *Attorney, Agent, or Firm* — Solaris Intellectual Property Group, PLLC

(57) ABSTRACT

An image processing device includes: a coefficient decision section that, for each of target pixels in a first image and a second image, decides on a parallax conversion coefficient to convert a parallax computed by a parallax computation section into a parallax visually confirmable that the first image and the second image are within the first parallax range in cases determined by a first determination section to be within the first parallax range, and that decides on a parallax conversion coefficient to convert the parallax into a parallax visually confirmable that the first image and the second image are outside the first parallax range in cases determined by the first determination section to be outside the first parallax range; and an image processing section that performs image processing on the target pixels based on the parallax conversion coefficient decided by the coefficient decision section.

22 Claims, 22 Drawing Sheets

(51) Int. Cl.
*G03B 13/18* (2006.01)
*H04N 9/04* (2006.01)
*H04N 9/07* (2006.01)
*G03B 35/08* (2006.01)
*H04N 13/00* (2006.01)

(52) U.S. Cl.
CPC ............... *H04N 9/045* (2013.01); *H04N 9/07* (2013.01); *H04N 13/0232* (2013.01); *H04N 13/0257* (2013.01); *H04N 13/0285* (2013.01); *H04N 13/0022* (2013.01); *H04N 2013/0081* (2013.01); *H04N 2209/045* (2013.01)

(58) Field of Classification Search
CPC ........... H04N 13/0285; H04N 13/0022; H04N 9/045; H04N 9/07; H04N 2013/0081; H04N 2209/045
USPC ................. 348/46, 49, 51, 42; 386/223, 341
See application file for complete search history.

(56) References Cited

U.S. PATENT DOCUMENTS

2012/0257018 A1* 10/2012 Shigemura ......... G02B 27/2214
 348/46
2013/0100260 A1* 4/2013 Tanaka ............... H04N 13/0022
 348/54

\* cited by examiner

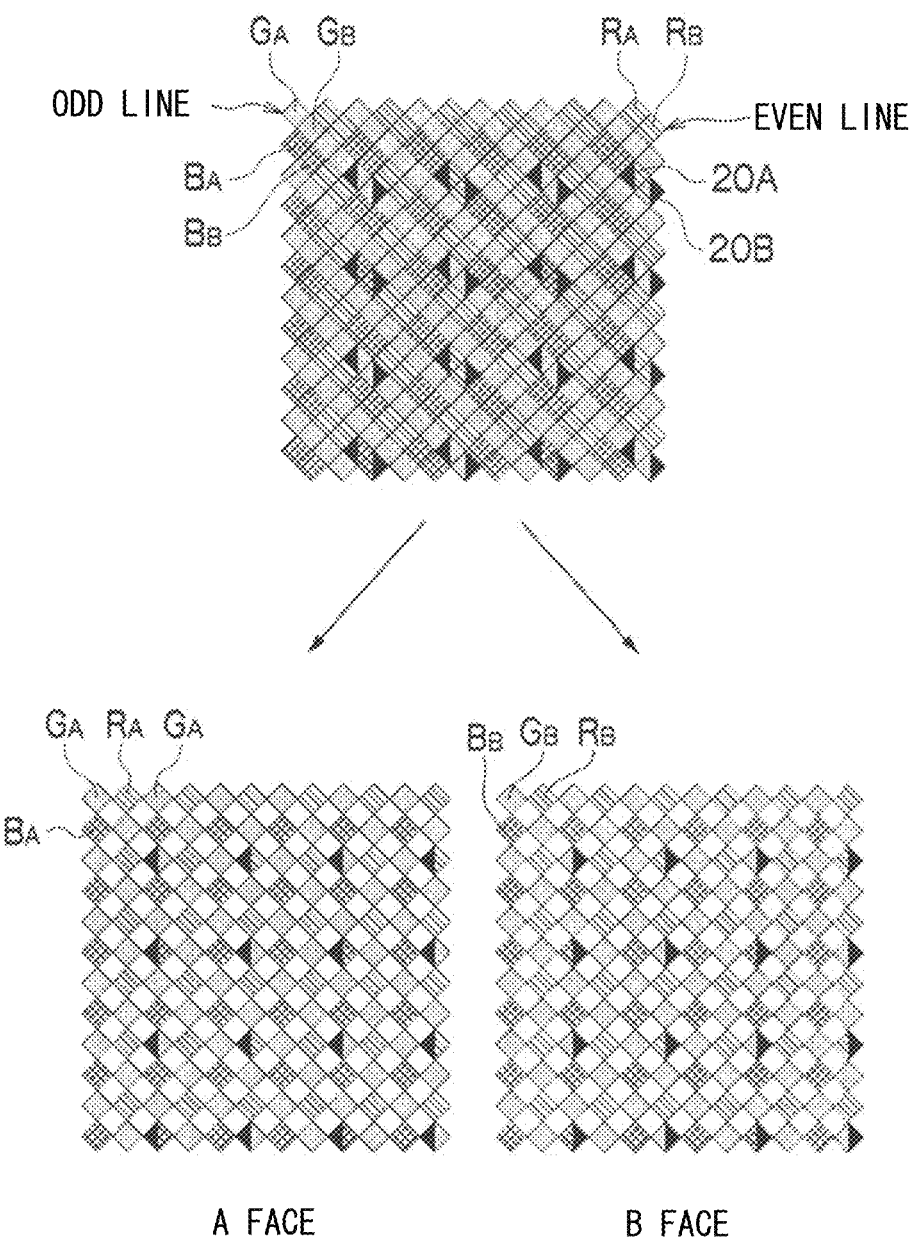

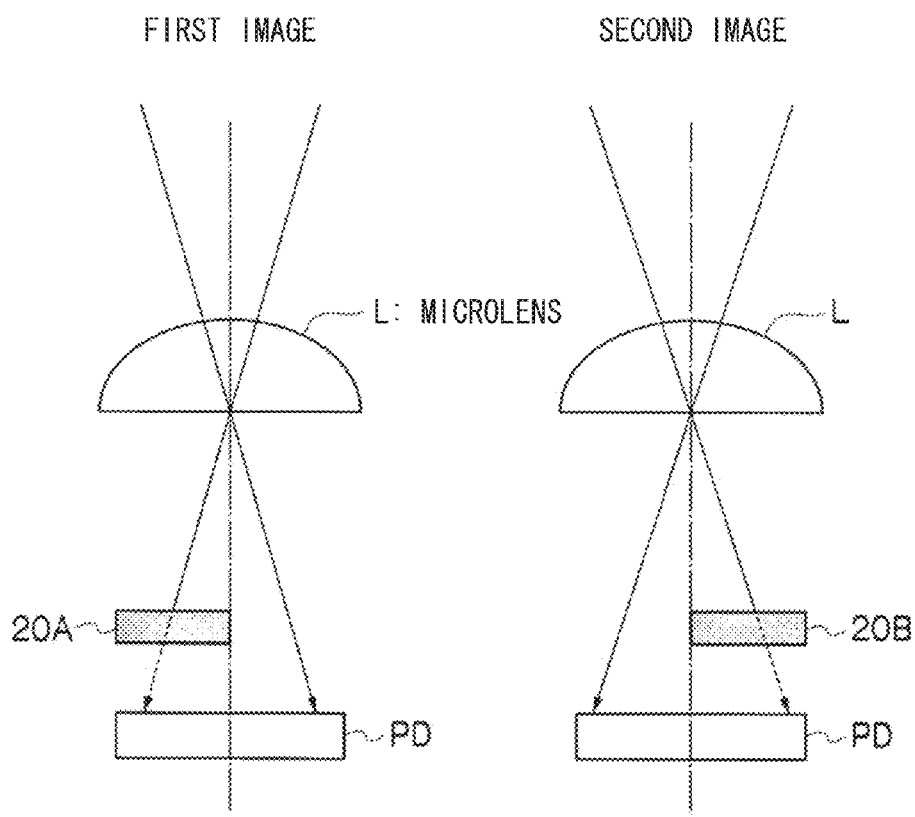
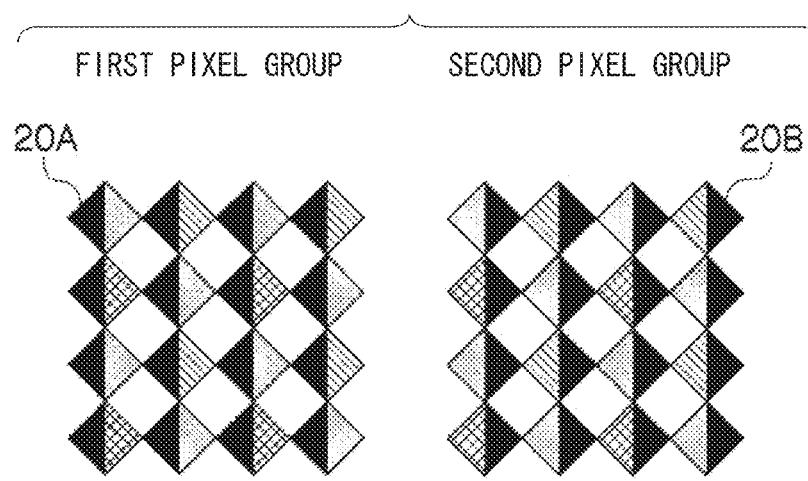

FREQUENCY WITH WHICH PERFECT
FOCUS DETERMINED BY PERSON
(WHEN VIEWED ON EVF)

PARALLAX ON EVF
(IN PIXELS)

TIMES ± STANDARD
DEVIATION s OF HISTOGRAM

FREQUENCY WITH WHICH PERFECT
FOCUS DETERMINED BY PERSON
(WHEN VIEWED ON DISPLAY SECTION)

PARALLAX ON
DISPLAY SECTION
(IN PIXELS)

Pout SET WITHIN RANGE
THREE TIMES ± STANDARD
DEVIATION s' OF HISTOGRAM

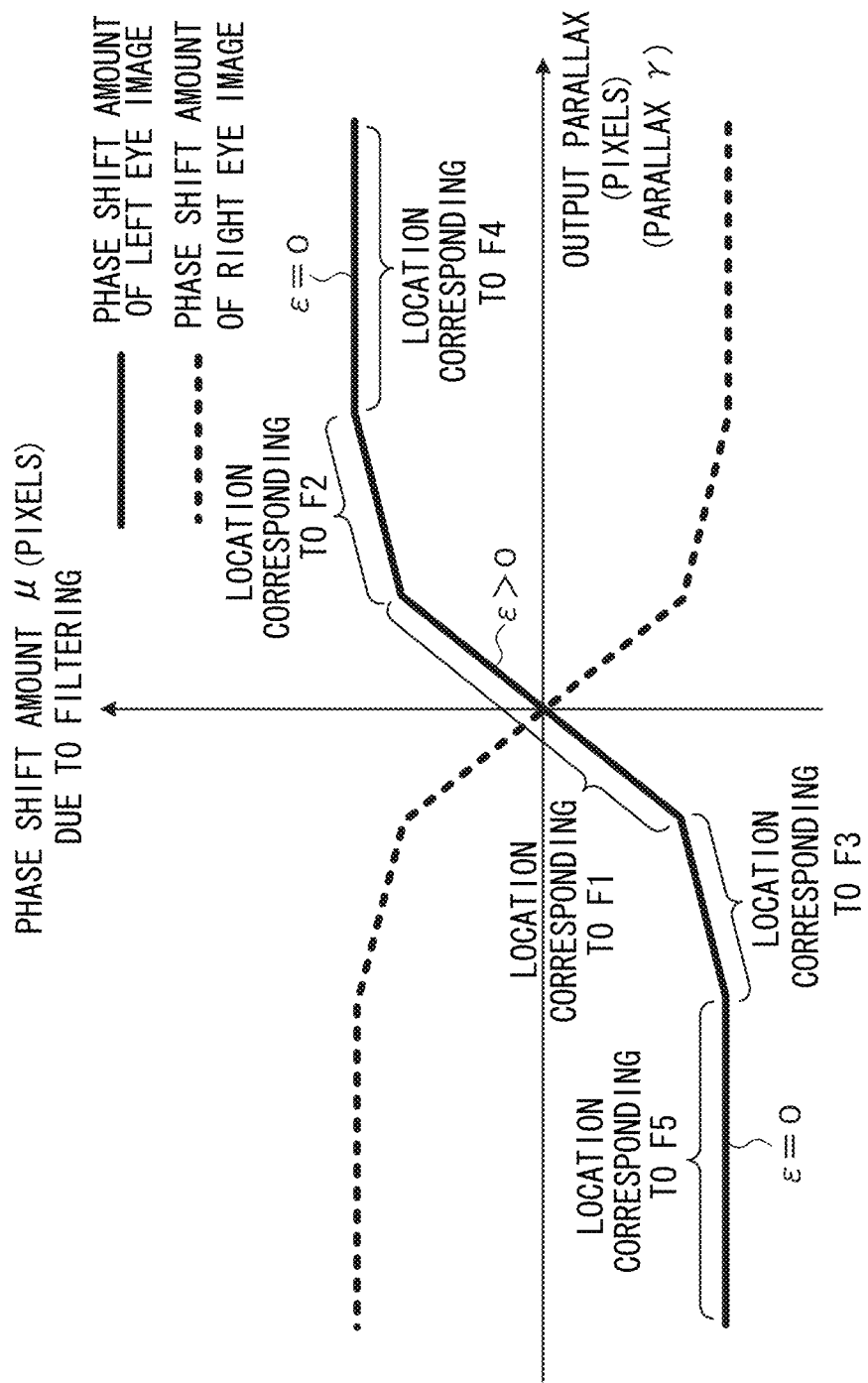

FIG.20A

FILTER $F_L$

FIG.20B

FILTER $F_R$

IMAGE PROCESSING DEVICE, IMAGING DEVICE, IMAGE PROCESSING METHOD, AND COMPUTER READABLE MEDIUM

CROSS-REFERENCE TO RELATED APPLICATIONS

This application is a continuation application of International Application No. PCT/JP2013/071182, filed Aug. 5, 2013, the disclosure of which is incorporated herein by reference in its entirety. Further, this application claims priority from Japanese Patent Application No. 2012-205907, filed Sep. 19, 2012, the disclosure of which is incorporated herein by reference in its entirety.

TECHNICAL FIELD

The present invention relates to an image processing device, an imaging device, an image processing method, and an computer readable medium.

RELATED ART

Digital cameras are widely known that are provided in addition to autofocus, in which phase difference detection methods and contrast detection methods are employed, with what is referred to as a manual focus mode, in which a user can manually perform focus adjustment.

Digital cameras including a manual focus mode are known in which a reflex mirror is provided to enable focus adjustment while checking an imaging subject, and a method is utilized in which a split microprism screen is employed to display the phase difference visually. Those that utilize a method in which contrast is checked visually are also known.

However, in digital cameras with the reflex mirror omitted that have become prevalent in recent years, since there is no reflex mirror, there is no method to check the subject-image while displaying the phase difference, and contrast detection methods have had to be relied on. However, in such cases, contrast cannot be displayed at a resolution greater than that of a display device, such as a Liquid Crystal Display (LCD), requiring adoption of methods such as enlarging a portion for display.

In recent years, therefore, a split-image is displayed within a live-view image (also referred to as a through image), so as to make the work of focusing on the imaging subject easier for the user when in manual focus mode. Split-image used herein refers to a divided image that has been divided into two, for example (such as respective images divided in the up-down direction) in which displacement is imparted in a parallax generation direction (such as the left-right direction) according to focus misalignment, and is a split-image in which the displacement in the parallax generation direction disappears in an in-focus state. An operator (such a photographer) operates a manual focus ring to focus so that the displacement in the split-image (such as respective images divided in the up-down direction) disappears.

In the imaging device described in Japanese Patent Application Laid-Open (JP-A) No. 2009-147665, out of light rays from an imaging optical system, a first subject-image and a second subject-image formed by light rays divided by a pupil divider are each photoelectrically converted to generate a first image and a second image. The first and the second images are employed to generate a split-image, and a third subject-image formed by light rays not divided by the pupil divider is photoelectrically converted to generate a third image. The third image is displayed on a display and the generated split-image is displayed inside the third image, and color data extracted from the third image is applied to the split-image. By applying color data extracted from the third image to the split-image in this way, excellent visual checkability of the split-image can be achieved.

Since the display resolution of the camera's electronic view finder and a display (such as an LCD) provided to a back face side of the camera is poor, focusing on an accurate exact focus position (the position of the image capture lens when in focused state) while viewing the split image is difficult. A method has therefore been proposed which employs a displacement amount in the parallax generation direction of the split image dependent on the parallax, and focus adjustment by a user is supported by emphasizing the parallax. This method enables the user to more intuitively recognize from the split image how much the focus is misaligned.

TECHNICAL PROBLEM

However, when emphasizing the parallax, issues arise in which the parallax is emphasized even in an in-focus verifiable parallax range where the parallax does not need to be emphasized (such as in a focused state), and parallax is not emphasized in an in-focus verifiable parallax range where parallax need to be emphasized.

SUMMARY

In consideration of the above circumstances, an object of the present invention is to provide an image processing device, an imaging device, an image processing method, and an image processing program that can emphasize the parallax without excessive or insufficient emphasis.

Solution to Problem

An image processing device according to a first aspect of the present invention includes: an image acquisition section that acquires a first image and a second image based on a first image signal and a second image signal output respectively from a first pixel group and a second pixel group that output the first image signal and the second image signal and on which a subject image is formed after passing through a first region and a second region in an imaging lens so as to be pupil-divided; a parallax computation section that computes a parallax representing a displacement amount between each of the pixels of the first image and the corresponding pixels of the second image acquired by the image acquisition section;

a first determination section that determines whether or not a target pixel for image processing is within a first parallax range satisfying a specific condition; a coefficient decision section that, for each of the target pixels in the first image and the second image acquired by the image acquisition section, determines a parallax conversion coefficient to convert the parallax computed by the parallax computation section into a parallax by which it is visually confirmable that the first image and the second image are within the first parallax range in cases determined by the first determination section to be within the first parallax range, and that determines a parallax conversion coefficient to convert the parallax computed by the parallax computation section into a parallax by which it is visually confirmable that the first image and the second image are outside the first parallax range in cases determined by the first determination section to be outside the first parallax range; an image processing section that performs image processing on the target pixels based on the parallax conversion coefficient determined by the coefficient decision section; a generation section that generates a first display image based on an image signal output from an image pick-up device including the first pixel group and the second pixel group, and generates a second display image for use in focus verification based on an image in which the image processing has been performed on the respective target pixels in the first image and the second image; a display section that displays images; and a display controller that controls the display section so as to display the first display image generated by the generation section and to display the second display image generated by the generation section in a display region of the first display image. This thereby enables parallax to be emphasized without excessive or insufficient emphasis better than in cases without such configuration.

In a second aspect of the present invention, the first aspect of the present invention may be configured such that the first determination section determines whether or not the target pixel is within the first parallax range according to the following Equation (1), wherein: We is the number of pixels in the parallax generation direction of the image pick-up device including the first pixel group and the second pixel group; We is the number of pixels in the parallax generation direction of an output destination of an image obtained by performing the image processing; κ is a coefficient less than 1 that decreases as at least one out of sensitivity of the image pick-up device or aperture number of the imaging lens increases; and Pe is a parallax within the first parallax range. This thereby enables higher precision determination of whether or not the image processing target pixel is within the first parallax range than in cases without such configuration.

$$Pe < \kappa \times (We/Wc) \quad \text{Equation (1)}$$

In a third aspect of the present invention, either the first aspect or the second aspect of the present invention may be configured further including a second determination section that determines whether or not the parallax computed by the parallax computation section is within a second parallax range wider than the first parallax range, wherein the parallax conversion coefficient is a parallax conversion coefficient that expands the parallax computed by the parallax computation section in cases in which the parallax computed by the parallax computation section is determined by the second determination section to be within the second parallax range. This thereby enables instances of excessive or insufficient parallax emphasis to be suppressed from occurring in the second parallax range that is wider than the first parallax range, with higher precision than in cases without such configuration.

In a fourth aspect of the present invention, any one of the first aspect to the third aspect of the present invention may be configured such that the parallax conversion coefficient is defined by a continuous function having an input of the parallax computed by the parallax computation section, and selectively outputting the parallax by which it is visually confirmable that the first image and the second image are within the first parallax range, or the parallax by which it is visually confirmable that the first image and the second image are outside the first parallax range. This thereby enables the degree of emphasis of parallax to be more easily predicted than in cases without such configuration.

In a fifth aspect of the present invention, the fourth aspect of the present invention may be configured such that the continuous function is a first linear function in a range of the parallax computed by the parallax computation section in cases determined by the first determination section to be within the first parallax range. This thereby enables the degree of emphasis of parallax to be more easily predicted in the first parallax range than in cases without such configuration.

In a sixth aspect of the present invention, the fifth aspect of the present invention may be configured such that the continuous function is a second linear function contiguous to the first linear function and having a shallower gradient than the first linear function in a range of the parallax computed by the parallax computation section in cases determined by the first determination section to be outside the first parallax range. This thereby enables sudden change in parallax emphasis to be suppressed better than in cases without such configuration.

In a seventh aspect of the present invention, the sixth aspect of the present invention may be configured such that the continuous function is the second linear function and an identity function contiguous to the second linear function in a range of the parallax computed by the parallax computation section in cases determined by the first determination section to be outside the first parallax range. This thereby enables excessive parallax emphasis to be better suppressed outside the first parallax range than in cases without such configuration.

In an eighth aspect of the present invention, any one of the first aspect to the seventh aspect of the present invention may be configured such that the parallax conversion coefficient is determined according to the type of viewing medium for viewing the image obtained by performing image processing. This thereby enables more appropriate determination of the degree of parallax emphasis for the type of viewing medium than in cases without such configuration.

In a ninth aspect of the present invention, any one of the first aspect to the eighth aspect of the present invention may be configured such that the first parallax range is made narrower as an aperture number of the imaging lens becomes higher. This thereby enables better suppression of instances of excessive or insufficient parallax emphasis from occurring depending on the aperture number than in cases without such configuration.

In a tenth aspect of the present invention, the ninth aspect of the present invention may be configured such that the image acquisition section further acquires a successive frame image captured with successive frames, and also acquires a single frame image captured in cases in which single frame image capture has been instructed, and sets the first parallax range narrower as an aperture number of the imaging lens becomes higher in cases in which capture of the single frame image has not been instructed. This thereby enables better suppression of excessive or insufficient parallax emphasis in cases in which capture of the single frame image has not been instructed than in cases without such configuration.

In an eleventh aspect of the present invention, the tenth aspect of the present invention may be configured such that the first parallax range is determined according to an aperture number to be used in single frame image capture in cases in which the single frame image capture has been instructed. This thereby enables better suppression of excessive or insufficient parallax emphasis in cases in which capture of the single frame image has been instructed than in cases without such configuration.

In a twelfth aspect of the present invention, the eleventh aspect of the present invention may be configured such that in cases in which the single frame image capture has been instructed, the first parallax range is made wider in cases in which the aperture value when instructed to capture the single frame image is higher than the aperture value employed to capture the successive frame image, and is made narrower in cases in which the aperture value when instructed to capture the single frame image is lower than the aperture value employed to capture the successive frame image. This thereby enables better suppression of instances of excessive or insufficient parallax emphasis from occurring depending on the aperture number than in cases without such configuration, even when capture of the single frame image has been instructed.

In a thirteenth aspect of the present invention, any one of the first aspect to the twelfth aspect of the present invention may be configured such that the second display image is a split-image corresponding to an image displaced along the parallax generation direction by a displacement amount according to the parallax between the first image and the second image after conversion by the parallax conversion coefficient. This thereby enables the magnitude of parallax and the parallax generation direction to be estimated better than in cases without such configuration.

In a fourteenth aspect of the present invention, any one of the first aspect to the thirteenth aspect of the present invention may be configured such that the parallax visually confirmable to be within the first parallax range is parallax evaluated to be in a focused state by a predetermined number of persons or above from plural test subjects who visually check in advance each of plural test images with different parallaxes. This thereby enables more appropriate determination of the degree of parallax emphasis within the first parallax range than in cases without such configuration.

In a fifteenth aspect of the present invention, any one of the first aspect to the fourteenth aspect of the present invention may be configured such that the parallax visually confirmable to be outside the first parallax range is parallax evaluated to be in a non-focused state by a predetermined number of persons or above from plural test subjects who visually check in advance each of plural test images with different parallaxes. This thereby enables more appropriate determination of the degree of parallax emphasis outside the first parallax range than in cases without such configuration.

In a sixteenth aspect of the present invention, any one of the first aspect to the fifteenth aspect of the present invention may be configured such that the image pick-up device includes a third pixel group on which a subject image is formed as a non-pupil-divided image to output a third image signal, and the generation section generates the first display image based on the third image signal output from the third pixel group. This thereby enables better image quality for the first display image than in cases without such configuration.

An imaging device of a seventeenth aspect of the present invention includes the image processing device of any one of the first aspect to the sixteenth aspect, and a storage section that stores images obtained by performing image processing. This thereby enables parallax to be emphasized without excessive or insufficient emphasis better than in cases without such configuration.

In an eighteenth aspect of the present invention, the seventeenth aspect of the present invention may be configured further including an electronic viewfinder that displays images obtained by the image processing; and a detection section that detects use of the electronic viewfinder, wherein the coefficient decision section selects an in-use parallax conversion coefficient predetermined as the parallax conversion coefficient to be employed during use of the electronic viewfinder in cases in which use of the electronic viewfinder has been detected by the detection section, and selects a non-use parallax conversion coefficient predetermined as the parallax conversion coefficient to be employed during non-use of the electronic viewfinder in cases in which use of the electronic viewfinder has not been detected by the detection section. This thereby enables the effort involved in deciding on appropriate parallax conversion coefficients for when the electronic viewfinder is, or is not, in use to be reduced compared to cases without such configuration.

In a nineteenth aspect of the present invention, the eighteenth aspect of the present invention may be configured such that in cases of displaying an image on which the image processing has been performed in a display region with a number of pixels in a parallax generation direction different from the number of pixels in the parallax generation direction of the electronic viewfinder, the non-use parallax conversion coefficient is set to a display region-use coefficient predetermined as the parallax conversion coefficient to be employed during use of the display region. This thereby enables more appropriate decision of the parallax conversion coefficient when the display region, this having a different number of pixels in the parallax generation direction to the number of pixels in the parallax generation direction of electronic viewfinder, is, or is not, in use compared to cases without such configuration.

In a twentieth aspect of the present invention, the nineteenth aspect of the present invention may be configured such that the number of pixels in the parallax generation direction of the display region is more than the number of pixels in the parallax generation direction of the electronic viewfinder, and a range of parallax after conversion by the display region-use coefficient is made narrower for target pixels determined by the first determination section to be within the first parallax range. This thereby enables better suppression of instances of excessive or insufficient parallax emphasis from occurring in images displayed on the display region, this having more pixels in the parallax generation direction than the number of pixels in the parallax generation direction of electronic viewfinder, than in cases without such configuration.

An image processing method of a twenty-first aspect of the present invention includes: an image acquisition step that acquires a first image and a second image based on a first image signal and a second image signal output respectively from a first pixel group and a second pixel group that output the first image signal and the second image signal and on which a subject image is formed after passing through a first region and a second region in an imaging lens so as to be pupil-divided; a parallax computation step that computes a parallax representing a displacement amount between each of the pixels of the first image and the corresponding pixels of the second image acquired by the image acquisition step; a first determination step that determines whether or not a target pixel for image processing is within a first parallax range satisfying a specific condition; a coefficient decision step that, for each of the target pixels in the first image and the second image acquired by the image acquisition step, determines a parallax conversion coefficient to convert the parallax computed by the parallax computation step into a parallax by which it is visually confirmable that the first image and the second image are within the first parallax range in cases determined by the first determination step to be within the first parallax range, and that determines a parallax conversion coefficient to convert the parallax computed by the parallax computation step into a parallax by which it is visually confirmable that the first image and the second image are outside the first parallax range in cases determined by the first determination step to be outside the first parallax range; an image processing step that performs image processing on the target pixels based on the parallax conversion coefficient decided by the coefficient decision step; a generation step that generates a first display image based on an image signal output from an image pick-up device including the first pixel group and the second pixel group, and generates a second display image for use in focus verification based on an image in which the image processing has been performed on each of the target pixels in the first image and the second image; a display step that displays images; and a display control step that controls a display section for displaying images so as to display the first display image generated by the generation step, and to display the second display image generated by the generation step in a display region of the first display image. This thereby enables parallax to be emphasized without excessive or insufficient emphasis better than in cases without such configuration.

In order to achieve the above objective, a non-transitory computer-readable storage medium storing a program for causing a computer to function as: the image acquisition section, the first determination section, the coefficient decision section, the image processing section, the generation section, and the display controller of the image processing device in any one of the first aspect to the sixteenth aspect. This thereby enables parallax to be emphasized without excessive or insufficient emphasis better than in cases without such configuration.

The present invention exhibits the advantageous effect of enabling parallax to be emphasized without excessive or insufficient emphasis.

BRIEF DESCRIPTION OF DRAWINGS

FIG. 4 is a schematic layout diagram illustrating an example of an array of a color filter and placement of light-blocking members provided to an image pick-up device included in an imaging device according to the first exemplary embodiment.

FIG. 5 is a schematic configuration diagram illustrating an example of a configuration of phase difference pixels (a first pixel and a second pixel) included in the image pick-up device illustrated in FIG. 4.

FIG. 6 is a schematic configuration diagram illustrating an example of a configuration of first pixels and second pixels included in the image pick-up device illustrated in FIG. 4.

FIG. 19 is a graph illustrating an example of a relationship between output parallax derived using an input-output function and phase shift amount according to the first exemplary embodiment.

FIG. 20A is a schematic diagram illustrating an example of a two dimensional filter for left eye image use according to the first exemplary embodiment.

FIG. 20B is a schematic diagram illustrating an example of a two dimensional filter for right eye image use according to the first exemplary embodiment.

DESCRIPTION OF EMBODIMENTS

Explanation follows regarding an example of an exemplary embodiment of an imaging device according to the present invention, with reference to the drawings.

First Exemplary Embodiment

Figure 1:
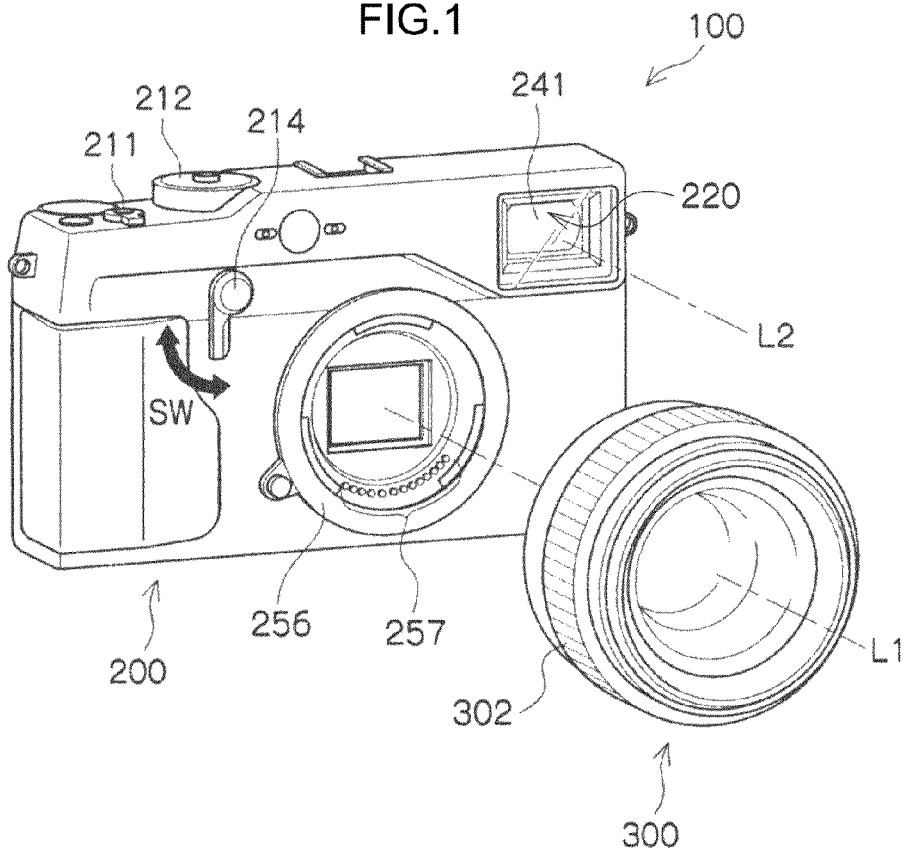
FIG. 1 is a perspective view illustrating an example of an external appearance of an imaging device that is an interchangeable-lens camera according to a first exemplary embodiment.
Figure 2:
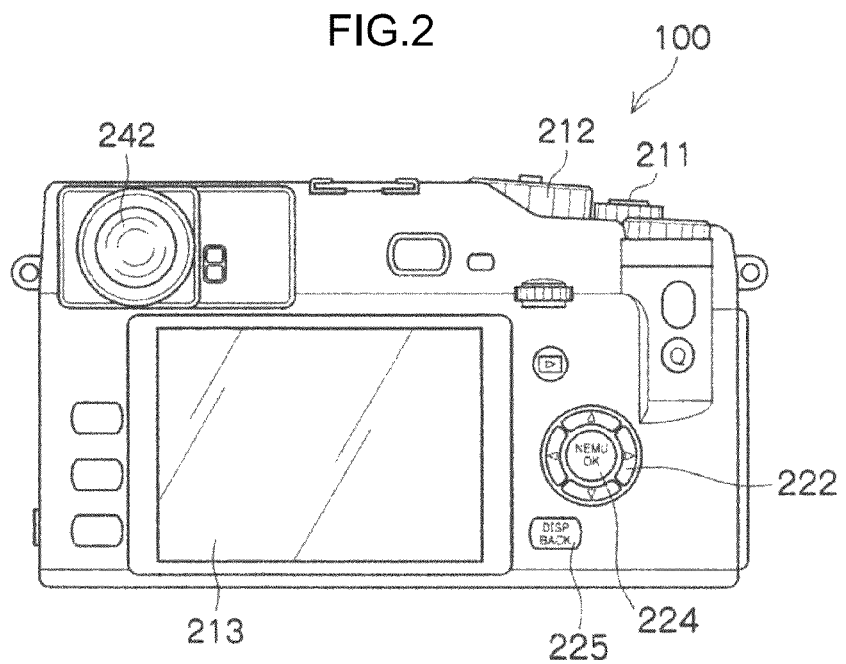
FIG. 2 is a back view illustrating the back face side of the imaging device illustrated in FIG. 1.

FIG. 1 is a perspective view illustrating an example of an external appearance of an imaging device 100 according to a first exemplary embodiment. FIG. 2 is a back view of the imaging device 100 illustrated in FIG. 1.

The imaging device 100 is an interchangeable lens camera, and is a digital camera with a camera body 200 and an interchangeable lens 300 (imaging lens and focusing lens 302 (manual operation section)) that is interchangeably mounted to the camera body 200, and without a reflex mirror. A HYBRID FINDER (registered trademark) 220 is also provided to the camera body 200. HYBRID FINDER 220 indicates, for example, a finder capable of selective operation as an optical viewfinder (referred to as "OVF" below), or as an electronic viewfinder (referred to as "EVF" below).

The camera body 200 and the interchangeable lens 300 are mounted interchangeably by coupling a mount 256 provided to the camera body 200 together with a mount 346 (see FIG. 3) provided on the interchangeable lens 300 side to correspond to the mount 256.

An OVF finder window 241 included in the HYBRID FINDER 220 is provided on the front face of the camera body 200. A finder switching lever (finder switching section) 214 is provided on the front face of the camera body 200. An optical image visible with the OVF and an electronic image (live-view image) visible with the EVF are selectively displayed (described later) by turning the finder switching lever 214 in the directions of the arrows SW. The optical axis L2 of the OVF is a different optical axis to the optical axis L1 of the interchangeable lens 300. The top face of the camera body 200 is mainly provided with a release button 211 and a dial 212 to set imaging mode, replay mode, and the like.

The back face of the camera body 200 is provided with an OVF finder eyepiece 242, a display section 213, a cross-key 222, a MENU/OK key 224, and a BACK/DISP button 225.

The cross-key 222 functions as a multifunction key to output various instruction signals, such as to select a menu, zoom, and to advance frames. The MENU/OK key 224 is an operation key that functions as a menu button to instruct display of a menu on the screen of the display section 213, and also doubles as an OK button function to confirm selected content, to instruct execution, or the like. The BACK/DISP button 225 is used to erase display content, such as a selected item, cancel designation content, or return to the one-previous operation state.

The display section 213 is implemented for example by an LCD, and is employed to display a live-view image (through image) that is an example of a successive frame image obtained by capturing successive frames during an imaging mode. The display section 213 is also employed to display a still image that is an example of a single frame image obtained by imaging a single frame in cases in which an instruction to capture a still image has been given. Moreover, the display section 213 is also employed to display a reproduced image in a reproduction mode, and to display menu screens and the like.

Figure 3:
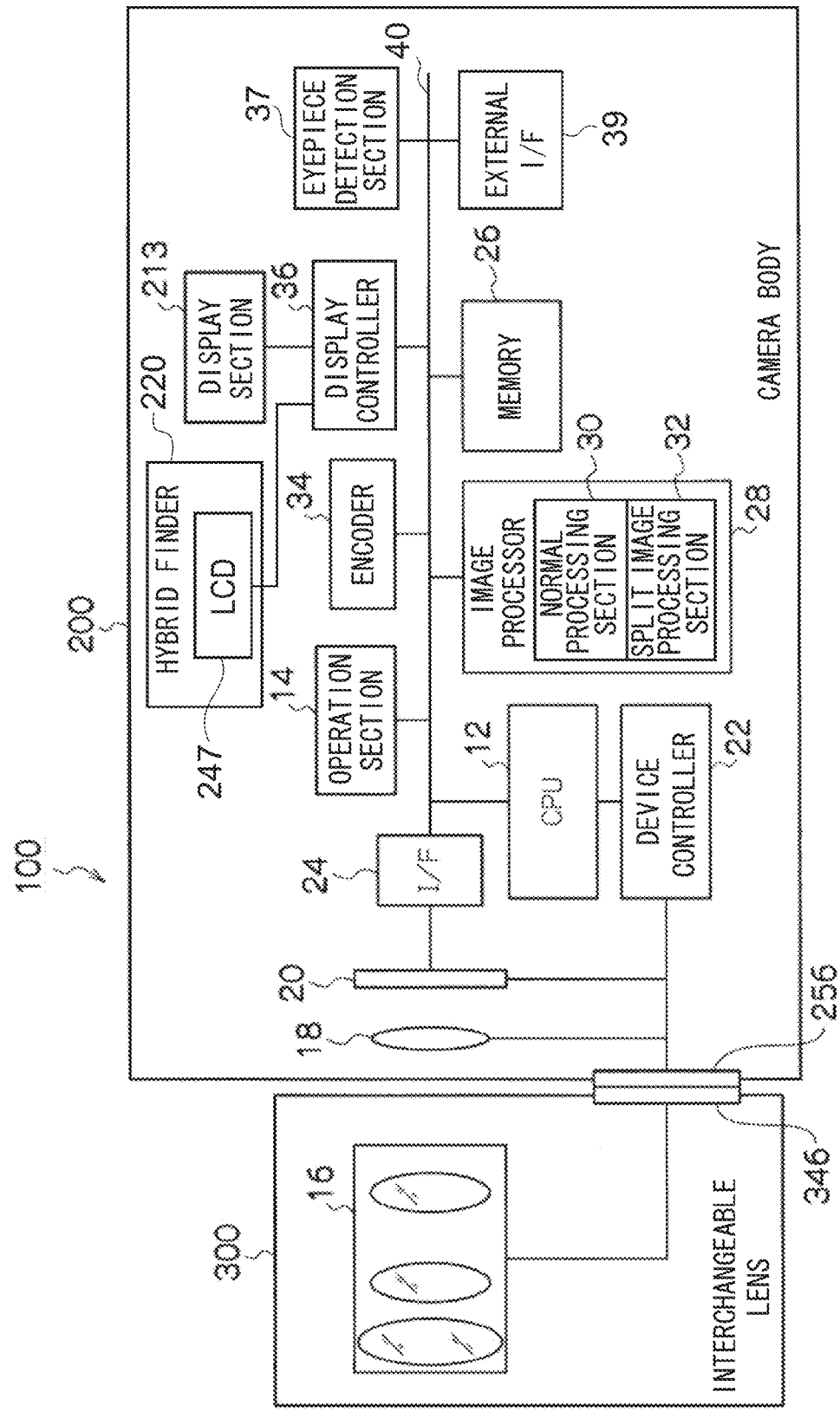
FIG. 3 is a block diagram illustrating an example of a configuration of an electrical system of an imaging device according to the first exemplary embodiment.

FIG. 3 is a block diagram illustrating an example of a configuration (internal configuration) of an electrical system of the imaging device 100 according to the first exemplary embodiment.

The imaging device 100 is a digital camera that records captured still images and video images, and the overall operation of the camera is integrally controlled by a Central Processing Unit (CPU) 12. In addition to the CPU 12, the imaging device 100 also includes an operation section 14, an interface section 24, a memory 26, an encoder 34, a display controller 36, and an eyepiece detection section 37. The imaging device 100 further includes an image processor 28 that is an example of an image acquisition section, a parallax computation section, a first determination section, a coefficient decision section, an image processing section, and a second determination section of the present invention. The CPU 12, the operation section 14, the interface section 24, the memory 26, the image processor 28, the encoder 34, the display controller 36, the eyepiece detection section 37, and an external interface (I/F) 39 are connected to each other through a bus 40.

The operation section 14 includes the release button 211, the dial (focus mode switching section) 212 to select the imaging mode and the like, the display section 213, the finder switching lever 214, the cross-key 222, the MENU/OK key 224, and the BACK/DISP button 225. The operation section 14 also includes a touch panel to receive various data. The touch panel, for example, overlays the display screen of the display section 213. Various operation signals output from the operation section 14 are input to the CPU 12.

When the imaging mode has been set, image light representing an imaging subject is formed as an image on a light receiving face of a color image pick-up device (for example a CMOS sensor) 20 through imaging lenses 16 that include a focus lens that is movable by manual operation and a shutter 18. Signal charges accumulated in the image pick-up device 20 are read in sequence as digital signals according to the signal charges (voltage) by a read signal input from a device controller 22. The image pick-up device 20 has what is referred to as an electronic shutter function, and the charge accumulation time (shutter speed) of each photosensor is controlled by the timing of the read signals by operating the electronic shutter function. The image pick-up device 20 according to the first exemplary embodiment is a Complementary Metal Oxide Semiconductor (CMOS) image sensor, however there is no limitation thereto, and a Charge-Coupled Device (CCD) image sensor may be employed.

FIG. 4 schematically illustrates an example of a color filter array and light-blocking member placement provided to the image pick-up device 20. As illustrated in FIG. 4, in the image pick-up device 20, a Bayer array A face pixel group and a Bayer array B face pixel group, serving as Red (R), Green (G), and Blue (B) color filters placed over each pixel, are disposed so as to be displaced from each other by half the pitch in both the horizontal direction and the vertical direction.

The A face pixel group includes a first pixel group, and the B face pixel group includes a second pixel group. The A face pixel group and the B face pixel group each also include a third pixel group. The first pixel group refers to, for example, plural first pixels employed for phase difference detection. The second pixel group refers to, for example, plural second pixels employed for phase difference detection. The third pixel group refers to, for example, plural normal pixels. Normal pixels refer to pixels that are not pixels employed for phase difference detection. "Normal pixels" refers to, for example, pixels not possessing light-blocking members 20A, 20B, described below. The first pixels and the second pixels are referred to collectively as "phase difference pixels" when there is no need to discriminate between them in the following.

An example of the first pixels and the second pixels placed in the image pick-up device 20 is illustrated in FIG. 5. The first pixels illustrated in FIG. 5 include the light-blocking members 20A, and the second pixels therein include the light-blocking members 20B. The light-blocking members 20A are provided at the front face side of a photodiode PD (microlens L side), and block light to the left half of the light receiving faces. The light-blocking members 20B are provided at the front face side of a photodiode PD, and block light to the right half of the light receiving faces.

The microlens L and the light-blocking members 20A, 20B function as a pupil divider, and the first pixels receive light only from light rays passing through an exit pupil of the imaging lenses 16 on the left side of the optical axis, and the second pixels receive light only from light rays passing through the exit pupil of the imaging lenses 16 on the right side of the optical axis. Thus the light rays passing through the exit pupil are divided to the left and right by the microlens L and the light-blocking members 20A, 20B serving as a pupil divider, and are respectively incident to the first pixels and the second pixels.

Portions in-focus (in a focused state) out of the subject-image corresponding to the light rays of the left half and the subject-image corresponding to the light rays on the right half among the light rays passing through the exit pupil of the imaging lenses 16 are focused at the same position on the image pick-up device 20. Conversely, portions in front of focus or behind focus are incident to different respective positions on the image pick-up device 20 to each other (with shifted phase). This thereby enables an image to be acquired with different parallax for the subject-image corresponding to the light rays of the left half, and the subject-image corresponding to the light rays of the right half.

FIG. 6 schematically illustrates an example of the first pixel group and the second pixel group of the image pick-up device 20 illustrated in FIG. 4. As illustrated in FIG. 6, the respective arrays of the color filters of the phase difference pixels in the first pixel group and the second pixel group are both Bayer arrays, and as illustrated in the example of FIG. 4, the first pixels and the second pixels are placed in mutually adjacent (minimum pitch) pairs. Phase difference between the first pixel group and the second pixel group is accordingly computed with higher precision than without such configuration.

Returning to FIG. 3, the image pick-up device 20 outputs a color image with the same color placement to that of the A face Bayer array (A face digital signal) and a color image with the same color placement to that of the B face Bayer array (B face digital signal). The color images output from the image pick-up device 20 are temporally stored in the memory 26 (for example SDRAM or the like) through the interface section 24.

The image processor 28 includes a normal processing section 30. The normal processing section 30 generates a color image by processing the R, G, B signals corresponding to the third pixel group out of the respective digital signals (the R, G, B signals) of the A face and the B face. The image processor 28 also includes a split-image processing section 32 that is an example of a generation section. The split-image processing section 32 generates color split-images by processing the R, G, B signals corresponding to the first pixel group and the second pixel group. The image processor 28 according to the first exemplary embodiment is implemented by an Application Specific Integrated Circuit (ASIC) that is a single integrated circuit combining multiple function circuits related to image processing. However, hardware configuration is not limited thereto, and, for example, configuration may be made with other hardware, such as a computer including a programmable logic device and a CPU, ROM, and RAM.

The encoder 34 converts an input signal into a signal of another format and outputs the converted signal. The HYBRID FINDER 220 includes an LCD 247 that displays an electronic image. The number of pixels in a specific direction in the LCD 247 (for example, in the horizontal direction that is the parallax generation direction), is fewer than the number of pixels in the same direction of the display section 213. The display controller 36 is connected to the display section 213 and the LCD 247, and displays images on the LCD 247 or the display section 213 by selectively controlling the LCD 247 and the display section 213. In the following, when there is no need to discriminate between the display section 213 and the LCD 247, they are referred to collectively as "display devices".

The imaging device 100 according to the first exemplary embodiment is configured to be switchable between a manual focus mode and an autofocus mode by operation of the dial 212 (the focus mode switching section). When the manual focus mode has been selected, the display controller 36 displays on the display devices a live-view image onto which the split-image has been synthesized. However, when the autofocus mode has been selected by the dial 212, the CPU 12 operates as a phase difference detection section and an automatic focus adjusting section. The phase difference detection section detects the phase difference between the image output from the first pixel group (referred to as the "first image" hereafter) and the image output from the second pixel group (referred to as the "second image" hereafter). The automatic focus adjusting section controls a lens drive section (not illustrated in the drawings) from the device controller 22 through the mounts 256, 346, based on the detected phase displacement, to move the imaging lenses 16 to the in-focus position such that a defocus amount of the imaging lenses 16 becomes zero. The "defocus amount" referred to above indicates, for example, a phase displacement amount between the first image and the second image.

The eyepiece detection section 37 detects a person (for example a photographer) looking into the finder eyepiece 242, and outputs the detection result to the CPU 12. The CPU 12 is accordingly able to ascertain, based on the detection result of the eyepiece detection section 37, whether or not the finder eyepiece 242 is being used.

The external I/F 39 is connected to external devices (for example a printer) through a connection line (not illustrated in the drawings), and controls transmission and reception of various data between external devices and the CPU 12. Thus the imaging device 100 is able to output still images obtained by image capture to a printer and for printing when a printer is connected as an external device. A photographer is also able to specify the type of recording medium for recording still images (for example L-size) and the number of prints, and print using the printer, by operating the operation section 14.

Figure 7:
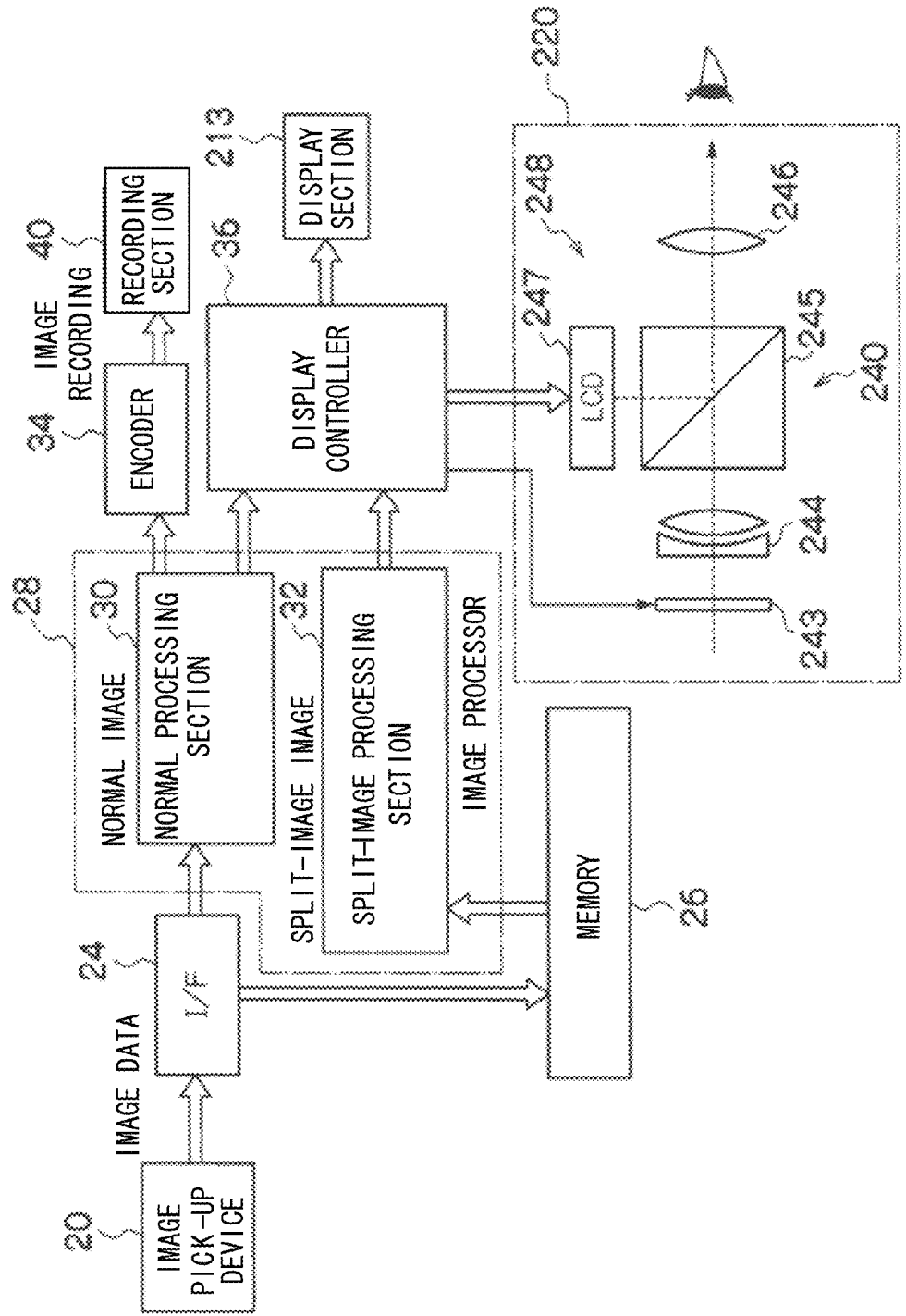
FIG. 7 is a block diagram illustrating an example of relevant functions of an imaging device according to the first exemplary embodiment.

FIG. 7 is a functional block diagram illustrating an example of relevant functions of the imaging device 100 according to the first exemplary embodiment. Common portions to the block diagram illustrated in FIG. 3 are appended with the same reference numerals.

The normal processing section 30 and the split-image processing section 32 each include a WB gain section, a gamma correction section, and a synchronization processing section (not illustrated in the drawings), and perform serial signal processing in each of the processing sections on the original digital signals (RAW images) temporarily stored in the memory 26. Namely, the WB gain section corrects white balance (WB) by adjusting the gain of the R, G, B signals. The gamma correction section gamma corrects each of the R, G B signals for which WB has been corrected by the WB gain section. The synchronization processing section performs color interpolation processing corresponding to the color filter array of the image pick-up device 20 (in this example a Bayer array), and generates synchronized R, G, B signals. The normal processing section 30 and the split-image processing section 32 perform parallel image processing on the RAW images each time one screen's worth of RAW image is acquired by the image pick-up device 20.

The normal processing section 30 is input with the R, G, B RAW images from the interface section 24, and uses the peripheral pixels of the same color from the third pixel group to interpolate and generate the R, G, B pixels of the first pixel group and the second pixel group. This thereby enables one screen worth of a RAW image of the third pixel group (referred to below as "third image") to be obtained similar to that of an image pick-up device including a third pixel group only, enabling a normal color image to be generated for recording based on the RAW image of the third pixel group.

The normal processing section 30 outputs image data of the generated normal color image for recording to the encoder 34. The R, G, B signals processed by the normal processing section 30 are converted (encoded) by the encoder 34 into a recording signal and recorded in a recording section. Moreover, a normal color image for display that is an image based on the third image processed by the normal processing section 30 is output to the display controller 36. In the following, for convenience of explanation, when there is no need to discriminate between the "normal color image for recording" and the "normal color image for display" they are referred to collectively as "normal images".

The image pick-up device 20 is capable of changing the exposure conditions of the A face pixel group and the B face pixel group (for example, the shutter speed with the electronic shutter), and is thereby capable of acquiring two images under different exposure conditions at the same time.

Consequently, the image processor 28 is capable of generating wide dynamic range images based on the two images with different exposure conditions. Moreover, two images may be acquired under the same exposure conditions at the same time, and adding these images together enables a high sensitivity image with little noise to be generated, or a high resolution image to be generated.

The split image processing section 32 extracts R, G, B signals of the first pixel group and the second pixel group from the RAW image temporarily stored in the memory 26. Then, based on the extracted R, G, B signals of the first pixel group and the second pixel group, a left parallax image and a right parallax image are generated by performing image processing including synchronization processing and the like, similarly to in the normal processing section 30. For convenience the "left parallax image" is referred to as "left eye image" and the "right parallax image" is referred to as "right eye image".

The split-image processing section 32 synthesizes an upper half image of the left eye image based on the first image output from the first pixel group together with a lower half image of the right eye image based on the second image output from the second pixel group to generate a split-image. Image data of the generated split-image is output to the display controller 36.

In the first pixel group and the second pixel group, the R, G, B signals of the first pixel group and the second pixel group have smaller values than the R, G, B signals of the third pixel group due to light-blocking at the left half or the right half of the light receiving faces. The split image processing section 32 accordingly preferably performs brightness correction to correct the brightness of the split-image to the same brightness as that of the third image output from the third pixel group.

The display controller 36 generates image data for display based on the image data for recording corresponding to the third pixel group input from the normal processing section 30, and image data of the split-image corresponding to the first and second pixel groups input from the split-image processing section 32. For example, the display controller 36 synthesizes a split-image displayed by image data input from the split-image processing section 32 onto a display region of a normal image displayed by image data for recording corresponding to the third pixel group input from the normal processing section 30. The image data obtained by synthesizing is then output to the display section 213. The split-image generated by the split-image processing section 32 is a divided-in-two image in which a portion of the left eye image and a portion of the right eye image are synthesized together. An example of what is referred to as "a divided-in-two image" is an image from synthesizing together an upper half image of a left eye image and a lower half image of a right eye image, and is an image divided-in-two with upper and lower images displaced from each other in a specific direction (for example the parallax generation direction) according to the focus state.

The method for synthesizing the split-image onto the normal image is not limited to a synthesis method in which the split-image is inserted in place of the image of a portion of a normal image. For example, a synthesis method may be employed in which the split-image is superimposed on the normal image. Moreover, a synthesis method may be employed in which, when superimposing the split-image, the transparencies of the image of the portion of the normal image onto which the split-image is to be superimposed and of the split-image are appropriately adjusted and superimposed. In this manner live-view images representing the successively captured subject images are displayed on the screen of the display section 213, and the displayed live-view images are images in which the split-image is displayed within the display region of the normal image.

The HYBRID FINDER 220 includes an OVF 240 and an EVF 248. The OVF 240 is a reverse Galileo finder including an objective lens 244 and an eyepiece lens 246, and the EVF 248 includes the LCD 247, a prism 245, and the eyepiece lens 246.

A liquid crystal shutter 243 is disposed at the front of the objective lens 244, and the liquid crystal shutter 243 blocks light such that the optical image is not incident to the objective lens 244 while the EVF 248 is being used.

The prism 245 reflects the electronic image or various data displayed on the LCD 247, guides these toward the eyepiece lens 246, and synthesizes an optical image together with the information (electronic image, various types of information) being displayed on the LCD 247.

When the finder switching lever 214 is turned in the arrow SW direction illustrated in FIG. 1, at each turn, switching is alternated between the OVF mode that enables a visual check to be made on an optical image using the OVF 240, and the EVF mode that enables a visual check to be made on the electronic image using the EVF 248.

In the OVF mode, the display controller 36 controls so that the liquid crystal shutter 243 is in a non-light blocking state, enabling a visual check to be made on an optical image through the eyepiece section. Moreover, only the split-image is displayed on the LCD 247. This thereby enables a finder image in which the split-image is superimposed on a portion of the optical image to be displayed.

In the EVF mode, the display controller 36 controls so that the liquid crystal shutter 243 is in a light blocking state, enabling a visual check to be made from the eyepiece section of only the electronic image being displayed on the LCD 247. Similar image data to the image data synthesized with the split-image for output to the display section 213 is input to the LCD 247, thereby enabling an electronic image in which the split-image is synthesized onto a portion of the normal image to be displayed similarly to with the display section 213.

Thus in the imaging device 100 according to the first exemplary embodiment, processing to correct parallax and processing to emphasize edges in the split-image are performed. What is referred to here as "processing to correct parallax" indicates, for example, processing to correct parallax (parallax appearing through the split-image) that depends on the amount of phase-shift imparted to the split-image by the image processor 28. In the following, for ease of explanation, the above "processing to correct parallax" and "processing to emphasize edges" will be referred to collectively as "parallax correction processing".

Figure 8:
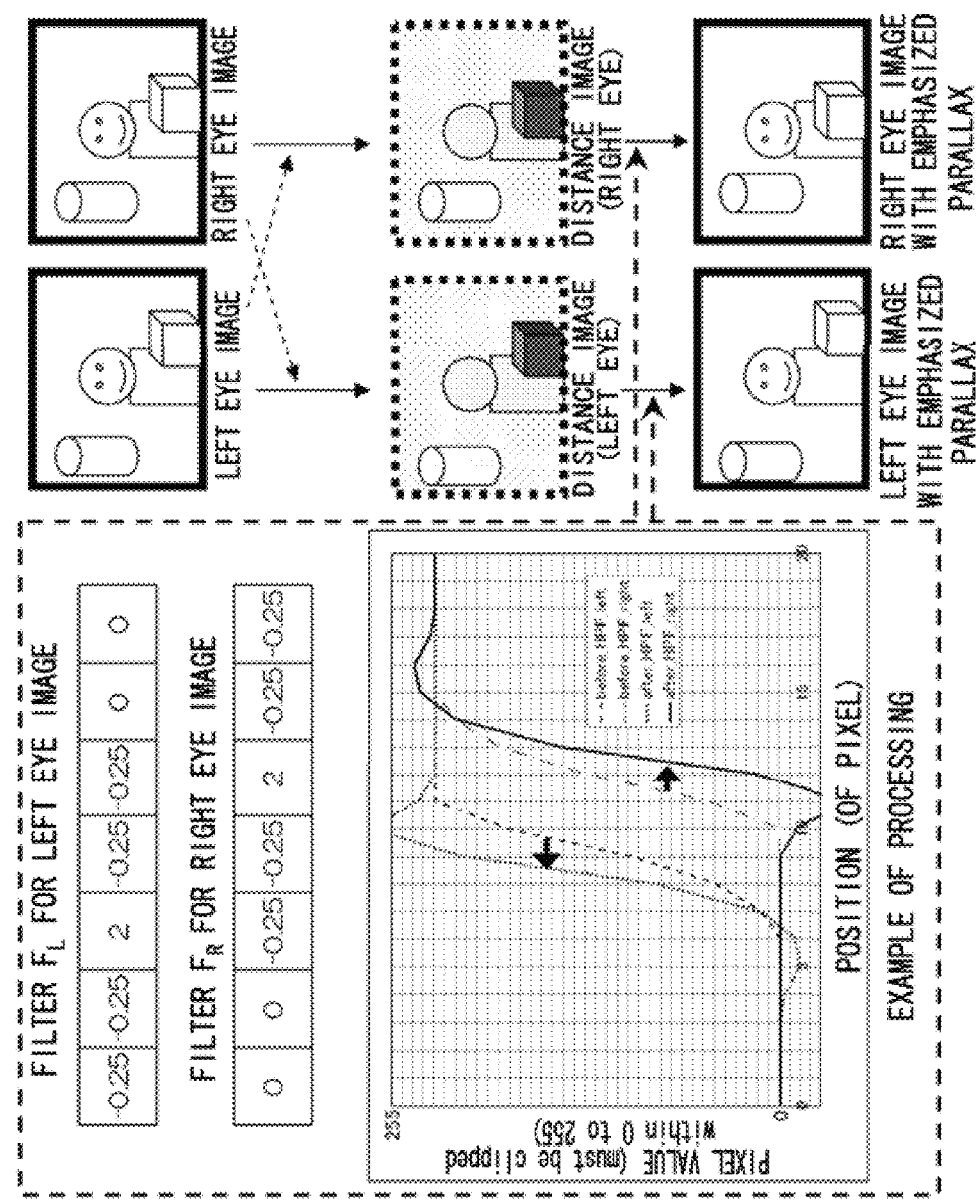
FIG. 8 is a diagram to accompany explanation of filter processing according to the first exemplary embodiment.

To perform parallax correction processing, the image processor 28 may first detect corresponding points in the left eye image and the right eye image, and measure the parallax. A correlation method or the like may be employed in detection of the corresponding points in the left eye image and the right eye image. For example, in a two dimensional coordinate system, a kernel such as 15 pixels in the x direction and 1 pixel in the y direction may be scanned, and corresponding points in the left eye image and the right eye image detected by searching for locations where there is the least sum of squares of differences in the pixel values. The parallax measurement result may, for example, be represented as a monochrome image (distance image) that is brighter the further away, and darker the closer, as illustrated in FIG. 8. It is also possible to measure the parallax at a sub-pixel level. Details of such a method are for example described in "Optimization of Correlation Function and Sub-Pixel Estimation Method on Block Matching" (Information Processing Society of Japan research report) by Motoki A R A I et al., volume 2004, issue 40 (CVIM-144), pages 33-40) and the like.

Generally in parallax measurement, there is the issue that "false detection is easily made with large parallax", and the issue that "it is difficult to detect corresponding points for corresponding points between flat portions (where the sum of squares of difference is small)". However, in the single lens imaging device 100 configured from single imaging lenses 16+ the image pick-up device 20 employed for phase difference detection, since the original parallax is extremely small, the former false detections are generally uncommon. For the latter false detections too, it can be said that even if, for example, phase was shifted with an error in corresponding point detection, there is little final effect on image quality due to it originally being a flat section.

When performing parallax correction processing, the image processor 28 sets a phase-shift filter (referred to below simply as "filter") at each local in the left eye image and the right eye image. For example, at a given location in the left eye image, in cases in which phase is shifted by only one pixel, a filter F ($F_L$, $F_R$) is set with filter coefficients (an example of image processing coefficients) intentionally shifted by 1 (pixel) about the center of filtering, as illustrated in FIG. 8. A single filter F configured by hardware suffices, set with respective filter coefficients for use on respective images during convolution operation (referred to below as filter processing) on the left eye image, and during filter processing on the right eye image.

The filter F is a DC component filter including a high pass filter. This thereby enables edge emphasis and phase shifting to be performed at the same time. The example filters $F_L$, $F_R$ illustrated in FIG. 8 each employ a kernel size (operation target pixel range) of 1×7 pixels, and the filter coefficients of each of the filters $F_L$, $F_R$ have the center of the filter coefficient shifted in opposite directions to each other from the kernel center. In the example illustrated in FIG. 8, the filter coefficient center of the filter $F_L$ is shifted by 1 pixel worth to the left, and in the filter $F_R$ is shifted by 1 pixel worth to the right. This thereby enables 2 pixels worth of expansion (emphasis) to be achieved in parallax overall.

Figure 9:
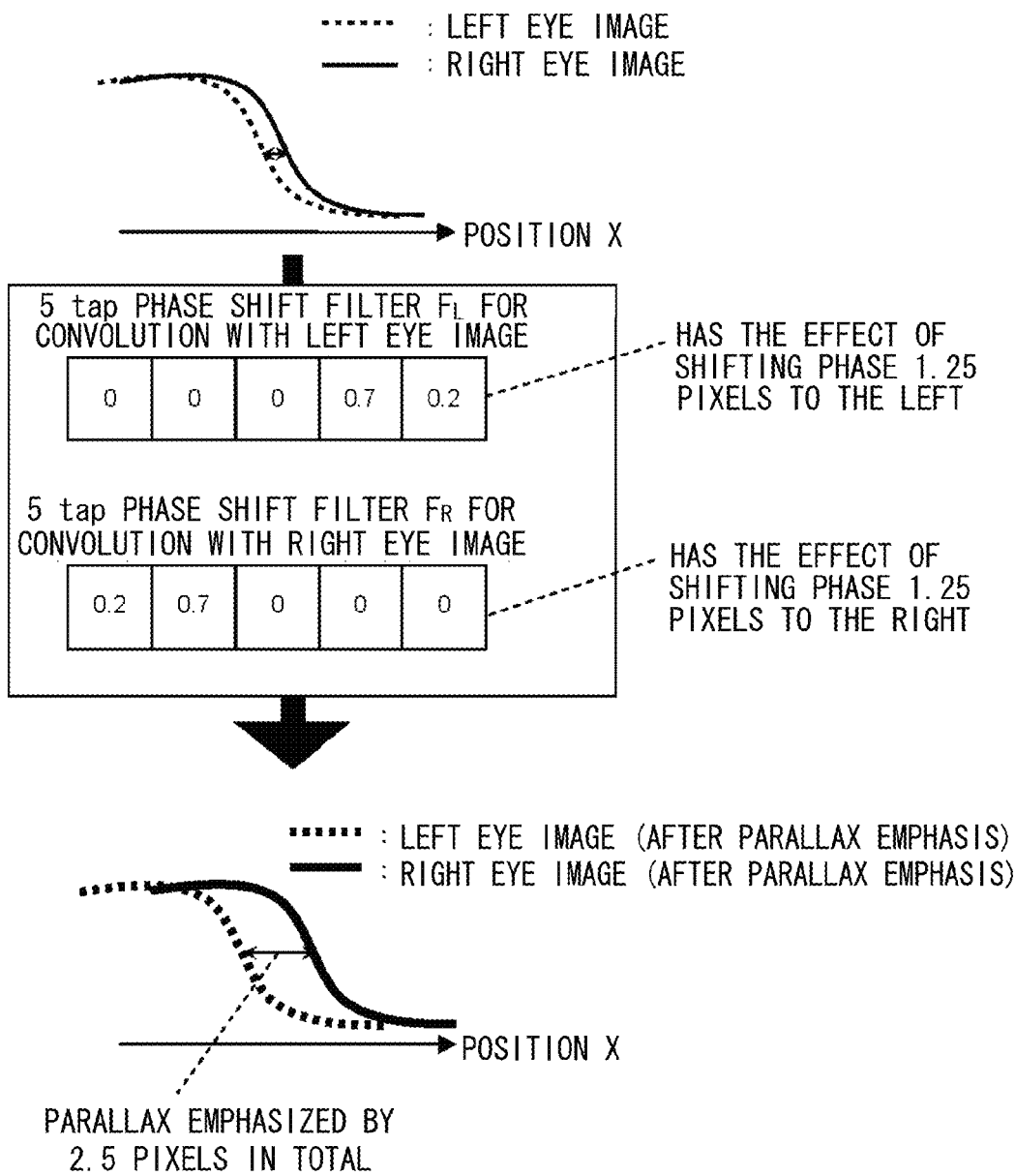
FIG. 9 is a schematic diagram illustrating an example of a filter employed in filter processing according to the first exemplary embodiment, different to the filter illustrated in FIG. 8.

Moreover, although in the example illustrated in FIG. 8 an example is given with a kernel size of 1×7 pixels, there is no limitation thereto and the kernel size may be 1×5 pixels. In such cases, for example as illustrated in FIG. 9, the filter coefficients of each of the filters $F_L$, $F_R$ have the center of the filter coefficient shifted in opposite directions to each other from the kernel center. In the example illustrated in FIG. 9, the filter coefficient center of the filter $F_L$ is shifted by 1.25 pixels worth to the left, and in the filter $F_R$ is shifted by 1.25 pixels worth to the right. This thereby enables 2.5 pixels worth of expansion (emphasis) to be achieved in parallax overall.

However, monotonically expanding the parallax for all the pixels by itself sometimes results in expanding the parallax where expansion is not required. An example thereof is a case in which parallax is expanded outside of an in-focus verifiable parallax range satisfying a specific condition, as an example of a first parallax range satisfying a specific condition, and irrespective of there being sufficiently large parallax to enable visual checking using the split-image. Another example is excessive expansion of parallax, within the in-focus verifiable parallax range, irrespective of there being parallax that does not need to be visually confirmed using the split-image. The above "focus verifiable parallax range satisfying a specific condition" indicates, for example, a parallax range enabling a person to visually confirm on a display screen of a display device (for example the display section 213) that the target pixels for image processing are in a focused state. Note that when the elements in the image pick-up device 20 corresponding to the image processing target pixels in the image capture system of the imaging device 100 are in the imaging subject depth of field, the image processing target pixels have a parallax enabling a person to visually confirm they are in a focused state on the display screen of the display device. Conversely, when the elements in the image pick-up device 20 corresponding to the image processing target pixels in the image capture system of the imaging device 100 are not in the imaging subject depth of field, the image processing target pixels have a parallax enabling a person to visually confirm they are in a non-focused state on the display screen of the display device.

Moreover, monotonically expanding the parallax for all the pixels by itself sometimes results in insufficient expansion of the parallax where sufficient expansion is required. An example thereof is outside the in-focus verifiable parallax range, wherein parallax is not expanded sufficiently irrespective of the parallax being so small that sufficient visual checking cannot be performed by using the split-image.

Figure 10:
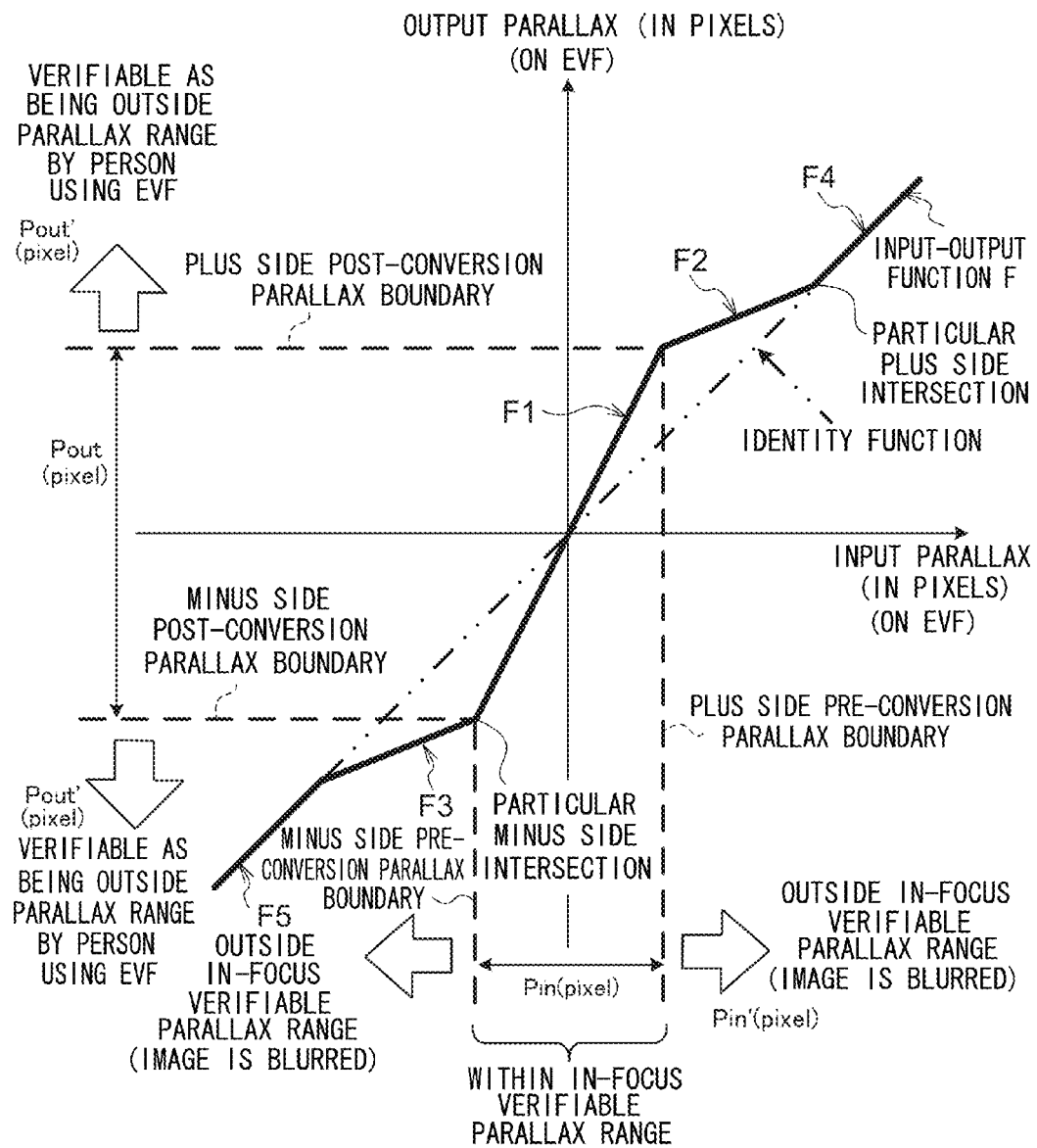
FIG. 10 is a graph illustrating an example of an input-output function (an input-output function employed at F1.4) according to the first exemplary embodiment.

In the imaging device 100 according to the first exemplary embodiment, the parallax finally output as the split-image parallax is decided on using, for example, an input-output function f illustrated in the FIG. 10, and the filter coefficients of the filters $F_L$, $F_R$ are decided on based on the decided parallax.

FIG. 10 illustrates an example of an input-output function f according to the first exemplary embodiment. As illustrated in FIG. 10, the range of parallax prior to conversion with the input-output function f (referred to below as the "input parallax") is classified into an in-focus verifiable parallax range Pin and an outside in-focus verifiable parallax range Pin'. The range of parallax after conversion with the input-output function f (referred to below as the "output parallax") indicates, for example, a range of parallax in the split-image. The range of output parallax is classified into a no visually discernable image displacement range Pout with parallax such that image displacement is not visually discernable by a person in the split-image, and a visually discernable image displacement range Pout' with parallax such that image displacement in the split-image is visually discernable by a person. Namely, the no visually discernable image displacement range Pout can be said to be a visually discernable parallax range in a range of parallax in which a focused state is visually discernable in the split-image. Reference here to the "range of parallax in which a focused state is visually discernable in the split-image" indicates, for example, a range of parallax in which it is visually discernable that an image based on the left eye image and an image based on the right eye image are not displaced from each other in the split-image. The visually discernable image displacement range Pout' can be said to be a visually discernable parallax range in a range of parallax in which a non-focused state is visually discernable in the split-image. Reference here to the "range of parallax in which a non-focused state is visually discernable in the split-image" indicates, for example, a range of parallax in which it is visually discernable that an image based on the left eye image and an image based on the right eye image are displaced from each other in the split-image. The input-output function f converts the in-focus verifiable parallax range Pin to the no visually discernable image displacement range Pout, and also converts the outside in-focus verifiable parallax range Pin' to the visually discernable image displacement range Pout'.

For ease of explanation, the boundary between the in-focus verifiable parallax range Pin and the outside in-focus verifiable parallax range Pin' is referred to below as the "pre-conversion parallax boundary". However, as illustrated in FIG. 10, the pre-conversion parallax boundary appears on both the plus side and the minus side of the input parallax. Thus when there is a need to distinguish therebetween in the following explanation, the pre-conversion parallax boundary on the input parallax plus side is referred to as the "plus side pre-conversion parallax boundary", and the pre-conversion parallax boundary on the input parallax minus side is referred to as the "minus side pre-conversion parallax boundary". The boundary between the no visually discernable image displacement range Pout and the visually discernable image displacement range Pout' is referred to as the "post-conversion parallax boundary". However, as illustrated in FIG. 10, the post-conversion parallax boundary appears on both the plus side and the minus side of the output parallax. Thus when there is a need to distinguish therebetween in the following explanation, the post-conversion parallax boundary on the output parallax plus side is referred to as the "plus side post-conversion parallax boundary", and the post-conversion parallax boundary on the output parallax minus side is referred to as the "minus side post-conversion parallax boundary".

The post-conversion parallax boundary may, for example, be defined based on the results of a sensory test with plural test subjects. For example, a boundary between a range evaluated by plural test subjects in a sensory test as being in a visually discernable image displacement range (for example in a focused state) and a range evaluated as being outside of a visually discernable image displacement range (for example in a non-focused state) may be employed as the post-conversion parallax boundary. Reference here to a "sensory test" indicates, for example, a test in which plural test subjects are asked in advance to visually check plural test images, and evaluation is made as to whether or not there is a focused state by a predetermined number of the plural test subjects or more out of the plural test subjects. In order to avoid confusion, as the "sensory test", a test is applied in which evaluation is made of whether or not there is a focused state; however the present invention is not limited thereto, and a test in which evaluation is made of whether or not there is an unfocused state may be applied as the "sensory test". Moreover, an example of a "test image" is, for example, a simulated image of a split-image of an image that combines a left eye image and a right eye image. An example of what is referred to here as "an image that combines a left eye image and a right eye image" is, for example, an image (an image corresponding to the split-image) obtained by synthesizing an image of the top half of the left eye image based on the first image together with an image of the bottom half of the right eye image based on the second image.

Figure 11:
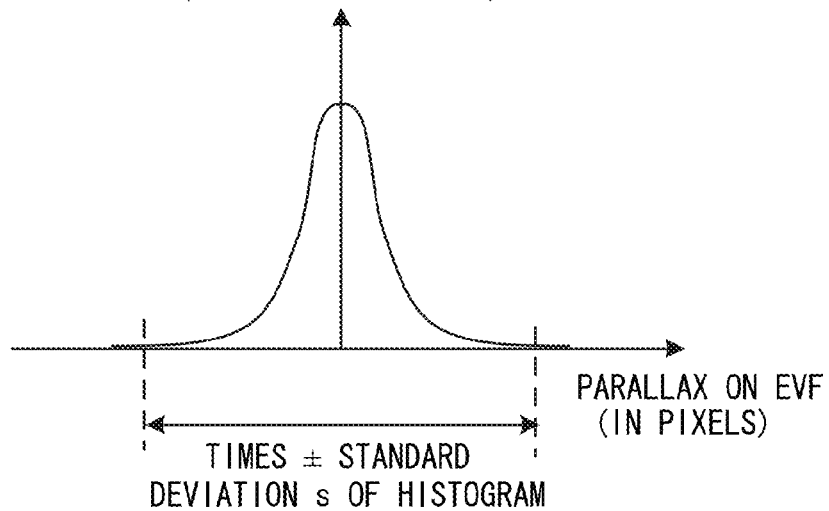
FIG. 11 is a graph illustrating an example of a histogram employed in deciding parallax on an EVF included in an imaging device according to the first exemplary embodiment.

The above "plural test images" indicate, for example, plural images with different parallaxes, or more specifically image groups with parallax displaced in steps of 0.1 pixel from −10 pixels to +10 pixels. In such cases the post-conversion parallax boundary is identified by using a statistical method by counting answers determined as being the least displaced images (in a focused state) by the plural test subjects visually checking while going through frames of each of the images included in the above image groups using the EVF 248. Examples of such a "statistical method" include methods using histograms and standard deviations. For example, the counted results of answers determined to be a focused state by the plural test subjects may be represented as a substantially left-right symmetrical histogram, as illustrated in the example of FIG. 11, with parallax of 0 pixels at the center. A range of a specific multiple of the ±standard deviation s of the histogram (a range three times the ±standard deviation s in the example illustrated in FIG. 11) is employed as the visually discernable image displacement range Pout. The histogram illustrated in FIG. 11 is, for example, a histogram in which the integral value is "50" if the number of test subjects is 50 people, with the vertical axis indicating the frequency with which "focused state" was determined by the test subjects, and the horizontal axis indicating the parallax (in pixels) on the EVF 248.

Figure 12:
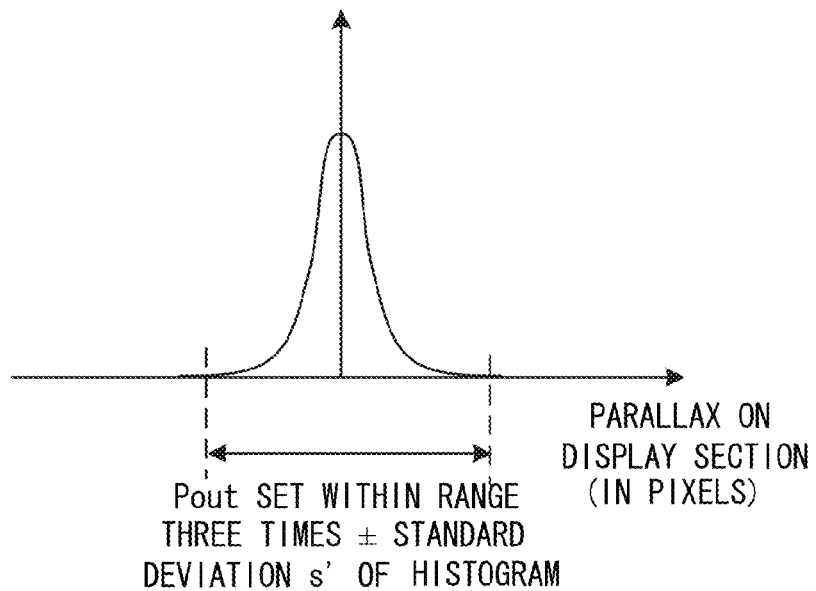
FIG. 12 is a graph illustrating an example of a histogram employed in deciding parallax on a display section included in an imaging device according to the first exemplary embodiment.

FIG. 12 illustrates an example of a histogram expressing the evaluation results by plural test subjects for images displayed on the display section 213. As illustrated in FIG. 12, similarly to FIG. 11, the evaluation by plural test subjects for images displayed on the display section 213 gives a substantially left-right symmetrical histogram with parallax of 0 pixels at the center. A range within a specific multiple of the ±standard deviation s' on the histogram (a range three times the ±standard deviation s' in the example illustrated in FIG. 12) may accordingly be employed as the visually discernable image displacement range Pout. Note that the histogram illustrated in FIG. 12 is, for example, a histogram in which the integral value is "50" if the number of test subjects is 50 people, with the vertical axis indicating the frequency with which "focused state" was determined by the test subjects, and the horizontal axis indicating the parallax (in pixels) on the EVF 213.

Returning to FIG. 10, the input-output function f is a continuous function, and includes a function F1 that converts the in-focus verifiable parallax range Pin to the visually discernable image displacement range Pout. The function F1 is a linear function connecting an intersection between the plus side pre-conversion parallax boundary and the plus side post-conversion parallax boundary with an intersection between the minus side pre-conversion parallax boundary and the minus side post-conversion parallax boundary (for example a first order function passing through the origin).

The input-output function f includes functions F2, F3 contiguous to the function F1. The function F2 is a linear function connecting the intersection (referred to below as the "particular plus side intersection") between the plus side pre-conversion parallax boundary and the plus side post-conversion parallax boundary with an intersection between a particular plus side input parallax and an identity function. An example of the "particular plus side input parallax" is a plus side input parallax that is sufficiently visually discernable even employed as it is as the output parallax. In such cases, a parallax may be employed that is evaluated in sensory tests with plural test subjects to be a sufficiently visually discernable parallax when employed as the output parallax. The photographer may also indicate through the operation section 14 a preferred parallax as the "particular input parallax" (for example a parallax that is sufficiently visually discernable by the photographer himself when employed as the output parallax).

The function F3 is a linear function connecting the intersection (referred to below as the "particular minus side intersection") between the minus side pre-conversion parallax boundary and the minus side post-conversion parallax boundary with an intersection between a particular minus side input parallax and an identity function. An example of the "particular minus side input parallax" is, similarly to the "particular plus side input parallax", a minus side input parallax that is sufficiently visually discernable even employed as the output parallax as it is.

The input-output function f includes a function F4 contiguous to the function F2. The function F4 is an identity function having the particular plus side intersection as the origin. The input-output function f also includes a function F5 contiguous to the function F3. The function F5 is an identity function having the particular minus side intersection as the origin.

Figure 13:
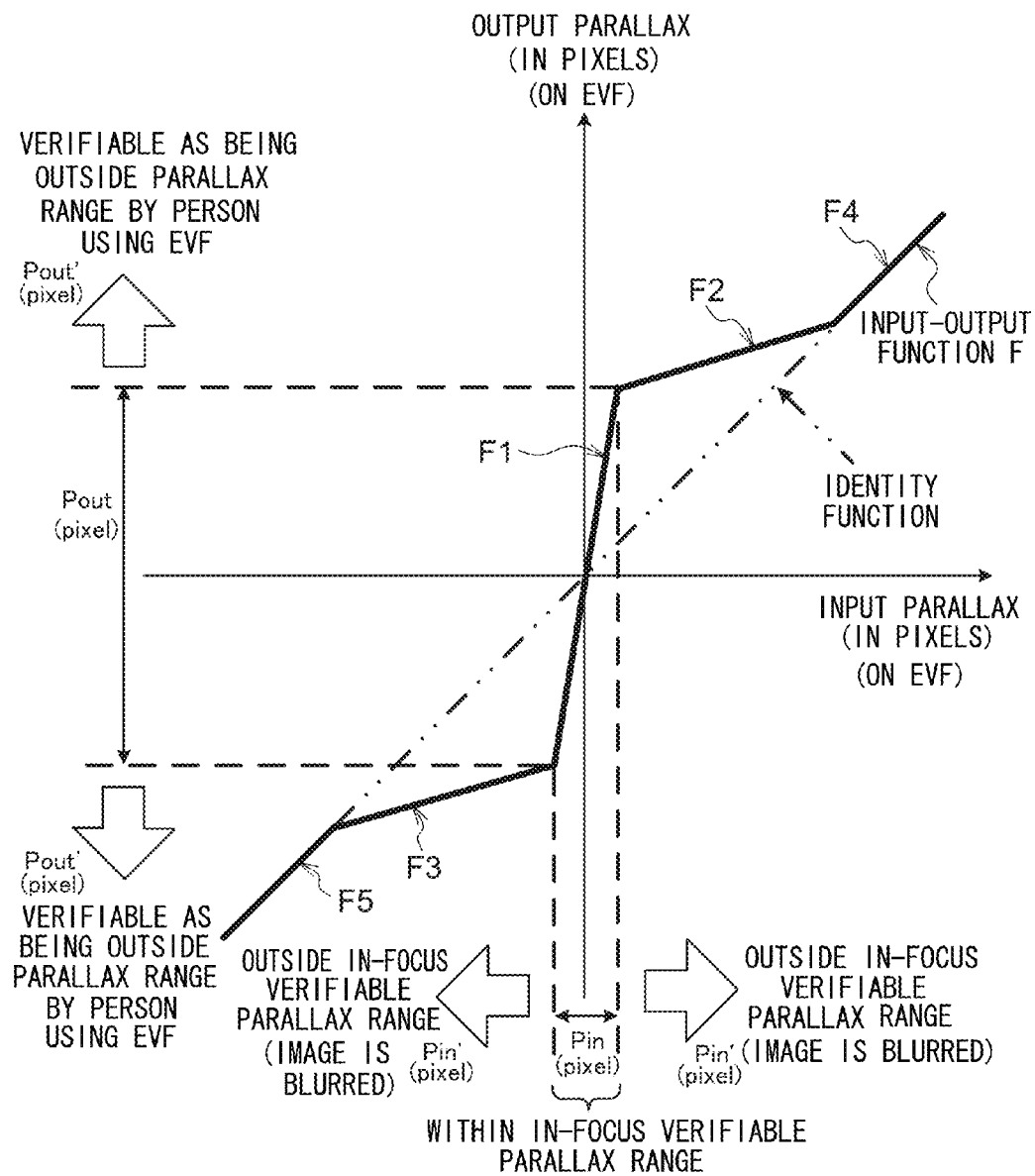
FIG. 13 is a graph illustrating an example of an input-output function (an input-output function employed at F3.5) according to the first exemplary embodiment.

FIG. 13 illustrates an example of another input-output function f according to the first exemplary embodiment. The imaging device 100 according to the first exemplary embodiment includes plural input-output functions f, and determines each of the input-output functions f according to the F number of the imaging lenses. For example, the input-output function f illustrated in FIG. 10 is employed when the F number is "1.4", and the input-output function f illustrated in FIG. 13 is employed when the F number is "3.5". In the input-output function f illustrated in FIG. 10 and the input-output function f illustrated in FIG. 13, the no visually discernable image displacement range Pout and the visually discernable image displacement range Pout' are unchanged (fixed). However, the in-focus verifiable parallax range Pin of the input-output function f illustrated in FIG. 13 is narrower than the in-focus verifiable parallax range Pin of the input-output function f illustrated in FIG. 10. Namely, the slope of the function F1 included in the input-output function f illustrated in FIG. 13 is steeper than the slope of the function F1 included in the input-output function f illustrated in FIG. 10. In other words, the function F1 of the input-output function f illustrated in FIG. 13 can be said to have a larger gain when converting parallax belonging to the in-focus verifiable parallax range Pin than the function F1 of the input-output function f illustrated in FIG. 10. Thus in the imaging device 100 according to the first exemplary embodiment, in each of the plural input-output functions f, the pre-conversion parallax boundary is positioned such that the in-focus verifiable parallax range Pin is narrower the higher the F number.

Figure 14:
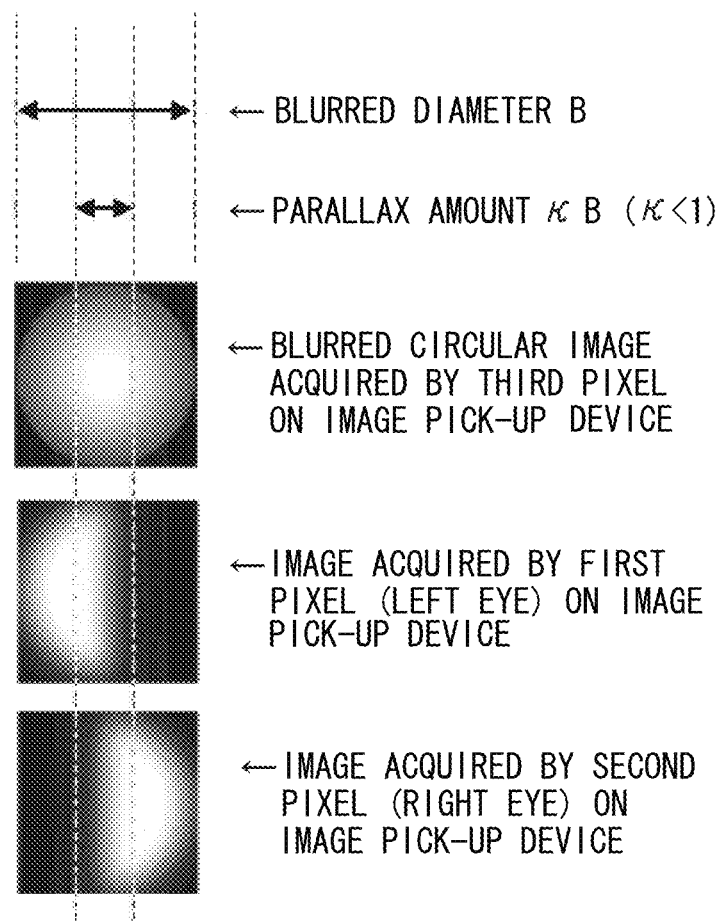
FIG. 14 is a schematic diagram illustrating a relationship between a blurred diameter and parallax amount in an image pick-up device included in an imaging device according to the first exemplary embodiment.

The in-focus verifiable parallax range is known to depend on the parallax on the image pick-up device 20. The parallax on the image pick-up device 20 is uniquely determined from the diameter (blurred diameter) (in pixels) of a blurred circular image the third pixels of the image pick-up device 20 acquire, as illustrated in the example of FIG. 14. Taking Pc as the parallax on the image pick-up device 20, and B (pixels) as the blurred diameter on the image pick-up device 20, then the parallax Pc can be expressed by the equation Pc=κB (pixels). "κ" is a value less than 1 dependent on the sensitivity of the image pick-up device 20 and the F number of the imaging lenses 16. Note that although in this example "κ" is a value less than 1 dependent on the sensitivity of the image pick-up device 20 and the F number of the imaging lenses 16, there is no limitation thereto, and it may be a value less than 1 dependent on either the sensitivity of the image pick-up device 20 or the F number of the imaging lenses 16.

In order to display an image in the in-focus verifiable parallax range on the EVF 248, the blurred diameter B on the image pick-up device 20 should be less than 1 pixel. Namely, an image within the in-focus verifiable parallax range on the EVF 248 can be obtained as long as the inequality Pc<κ is satisfied. Taking Pe as the parallax on the EVF 248, We as the width of the EVF 248 (in pixels), and We as the width of the image pick-up device 20 (in pixels), then the inequality Pc<κ may be rewritten as the inequality Pe×Wc/We<κ (in pixels). Thus an image within the in-focus verifiable parallax range on the EVF 248 can be obtained as long as the inequality Pe<κ×We/Wc (in pixels) is satisfied. In the imaging device 100 according to the first exemplary embodiment, the in-focus verifiable parallax range Pin is defined according to the inequality Pe<κ×We/Wc (in pixels). The width We of the EVF 248 indicates, for example, the number of pixels in a specific direction on the EVF 248 (for example the horizontal direction that is the parallax generation direction), and the width We of the image pick-up device 20 indicates, for example, the number of pixels in the specific direction on the image pick-up device 20 (for example the horizontal direction that is the parallax generation direction).

When performing parallax correction processing, the image processor 28 next performs phase shifting on the left eye image and the right eye image by performing filter processing using the filters $F_L$, $F_R$ set as described above. Namely, filter processing is performed using, for example, the filter $F_L$ illustrated in FIG. 8 for a pixel group of 1×7 pixels centered on the target pixel (pixel of interest) for which corresponding point detection was performed in the left eye image. The pixel of interest is thereby edge emphasized, and phase shifted by 1 pixel worth to the left. Similarly, filter processing is performed using, for example, the filter $F_R$ illustrated in FIG. 8 for a pixel group of 1×7 pixels centered on the pixel of interest in the right eye image corresponding to the pixel of interest in the left eye image. The pixel of interest is thereby edge emphasized, and phase shifted by 1 pixel worth to the right. Thereby, the pixel positions are expanded by 2 pixels worth overall, and parallax is expanded by shifting the pixel of interest in the left eye image 1 pixel worth of phase shift to the left, and by shifting the pixel of interest in the right eye image 1 pixel worth of phase shift to the right.

The filter according to the first exemplary embodiment also performs edge emphasis at the same time as parallax expansion. However, generally the left eye image and the right eye image captured by a 3D imaging device employing phase difference pixels have the characteristic of being blurred in locations where there is large parallax. There is a possibility that too much edge emphasis on the blurred locations would lead to an increase in noise.

Thus in the imaging device 100 according to the first exemplary embodiment, processing is performed to weaken the amount of edge emphasis according to the parallax expansion. This thereby enables distinct locations to be made more distinct, while reducing the noise of blurred locations.

The following method may, for example, be considered for correcting the amount of edge emphasis according to the parallax expansion. First, consider frequency characteristics for filtering expressible as the following Equation (1).

(frequency characteristics of the filter coefficient)=
(DC component)+α×(HPF component)=(DC component)+α×((DC component)−(LPF component))        Equation (1)

Figure 15A:
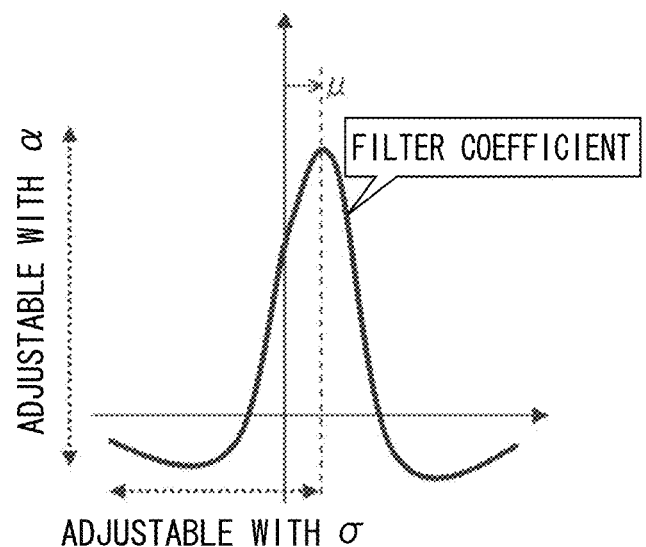
FIG. 15A is a graph schematically illustrating a filter coefficient.

Taking α as the strength of the edge emphasis, μ as the phase shift amount for displacement, treating the LPF component as a Gaussian curve with standard deviation σ, and performing Fourier transformation on Equation (1), gives a filter coefficient of the following equation. Note that the filter coefficient is expressed, for example, as illustrated in FIG. 15A. The edge emphasis strength a may be controlled by the frequency band σ. The HPF strength may controlled according to the parallax by setting the edge emphasis strength α as a function of the parallax (pixels) of the original image (see, for example, FIG. 15B).

$$\text{(Filter coefficient)} = \delta(x-\mu) + \alpha\left(\delta(x-\mu) - \frac{1}{\sqrt{2\pi\sigma^2}}e^{-\frac{(x-\mu)^2}{2\sigma^2}}\right) \quad \text{[Equation 1]}$$

$$= (1+\alpha)\delta(x-\mu) - \frac{\alpha}{\sqrt{2\pi\sigma^2}}e^{-\frac{(x-\mu)^2}{2\sigma^2}}$$

(Wherein δ is a delta function.)

Figure 16:
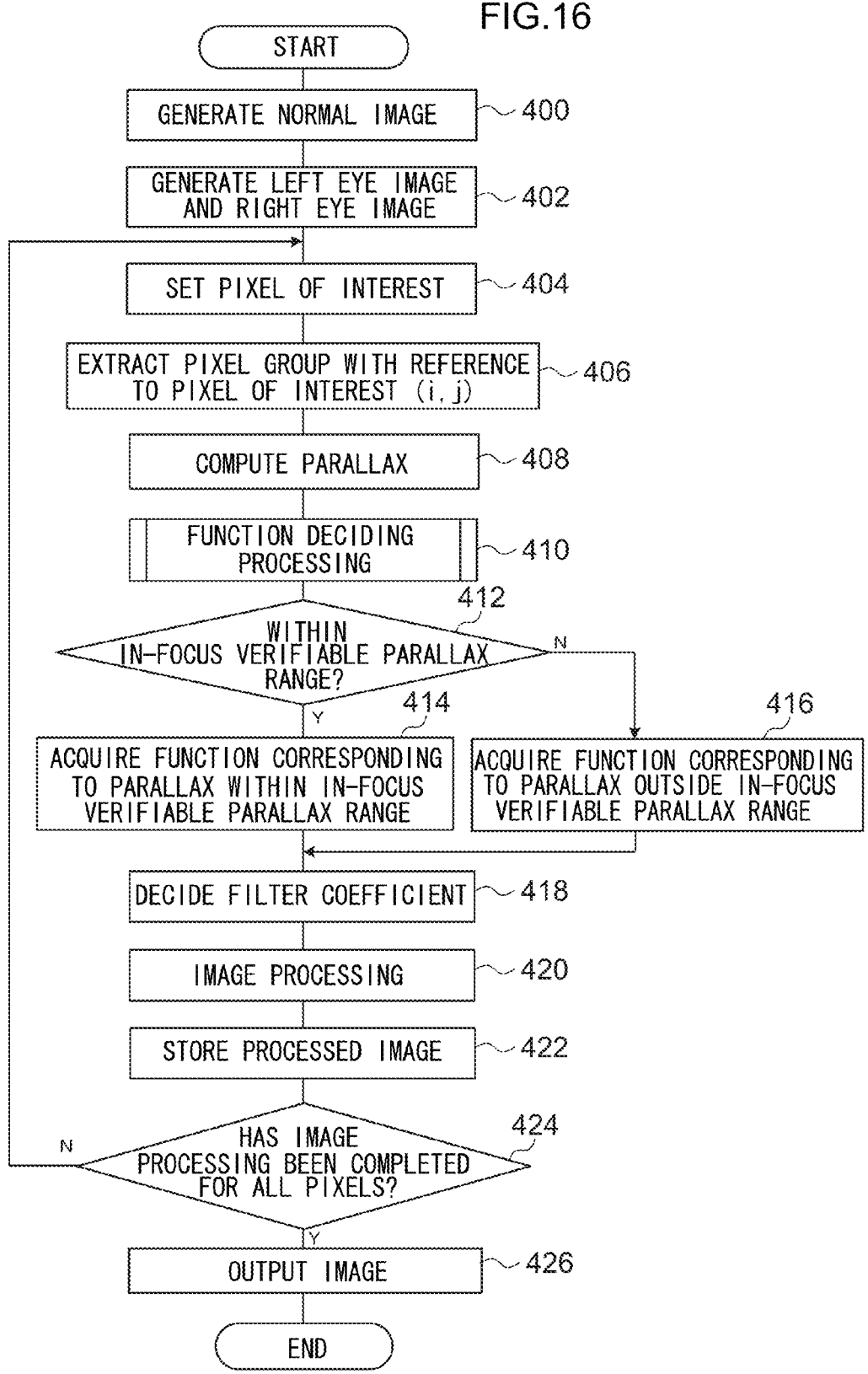
FIG. 16 is a flowchart illustrating an example of flow of image processing performed in an image processor included in an imaging device according to the first exemplary embodiment.

As operation of the first exemplary embodiment, explanation next follows regarding image processing, including the parallax correction processing described above, performed by the image processor 28, with reference to FIG. 16. Note that the image processing is performed in the example here by the image processor 28, however the present invention is not limited thereto, and, for example, the image processing may be performed in the imaging device 100 by the CPU 12 executing an image processing program.

In FIG. 16, at step 400 a normal image is generated by the image processor 28 based on the input third image. The normal image generated at step 400 is stored by the image processor 28 in a specific storage region (for example in the memory 26). At the next step 402, a left eye image based on the input first image and a right eye image based on the input second image are generated by the image processor 28, then processing transitions to step 404.

At step 404, the image processor 28 sets a processing target pixel from out of all the pixels in one out of the left eye image and the right eye image generated at step 402. In order to avoid confusion, a processing target pixel (pixel of interest (i, j)) is set from out of all the pixels the left eye image generated at step 402. In such a case, if the image size of the left eye image is for example m x n pixels, the pixel of interest is moved sequentially each time step 404 is performed, from pixel (1, 1) to pixel (m, n).

At the next step 406, a pixel group of specific block size, (Cx×Cy) pixels, is extracted by the image processor 28 as a pixel group with reference to the pixel of interest (i, j) set at step 404. At the next step 408, the image processor 28 computes parallax representing the displacement amount of corresponding pixels in the right eye extracted at step 406 with respect to each of the pixels in the left eye image extracted at step 406.

Figure 17:
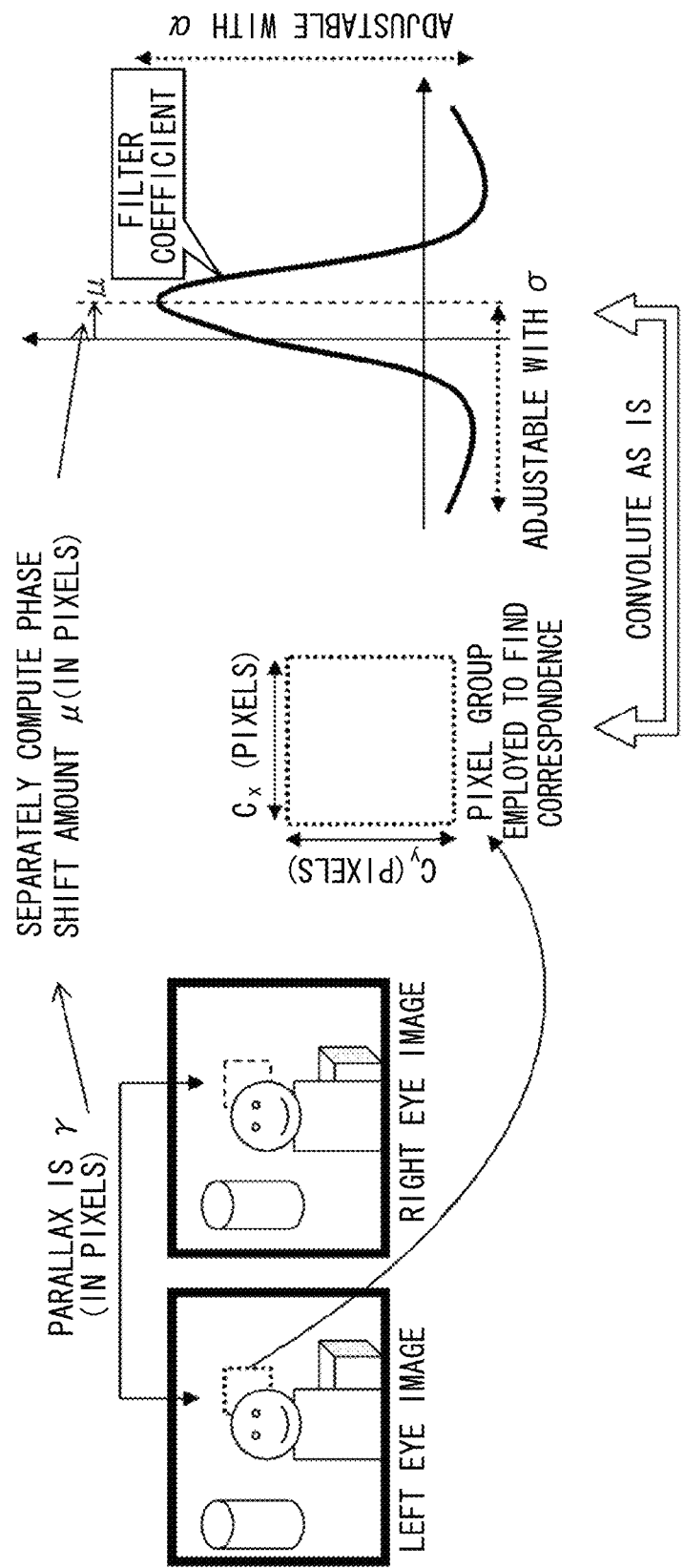
FIG. 17 is a schematic diagram illustrating an example of a manner in which filter processing is performed during parallax computation.

At step 408, based on the pixel group of the left eye image extracted at step 406, the image processor 28, for example, first searches for a pixel group in the right eye image with matching characteristic points. Namely, as in the example illustrated in FIG. 17, degree of matching is evaluated between the pixel group (block) extracted from the left eye image, and, from out of the right eye image, blocks in the right eye image and the pixel group (block) extracted from the left eye image. Then, the pixel acting as a reference in the right eye image block when there is the maximum degree of matching between blocks is set as the corresponding point pixel of the right eye image, to correspond to the pixel of interest in the left eye image. In the block matching method of the first exemplary embodiment, the degree of matching is evaluated between blocks by, for example, employing the sum of squared difference (SSD) in brightness of the pixels in each of the blocks as a degree of matching evaluation function (an SSD block matching method).

In an SSD block matching method, the computation is performed according to the following equation on each of the pixels f(i, j), g(i, j) in the blocks of both comparison target images.

$$SSD = \sum_i \sum_j \{f(i, j) - g(i, j)\}^2 \qquad \text{[Equation 2]}$$

The computation of [Equation 2] is performed while moving the position of the block in the right eye image within a specific search region, and the pixel at the position in the search region with the minimum SSD value is set as the search target pixel. Then, the parallax representing the displacement amount between the pixel of interest in the left eye image and the corresponding pixel found in the right eye image is computed.

Figure 18:
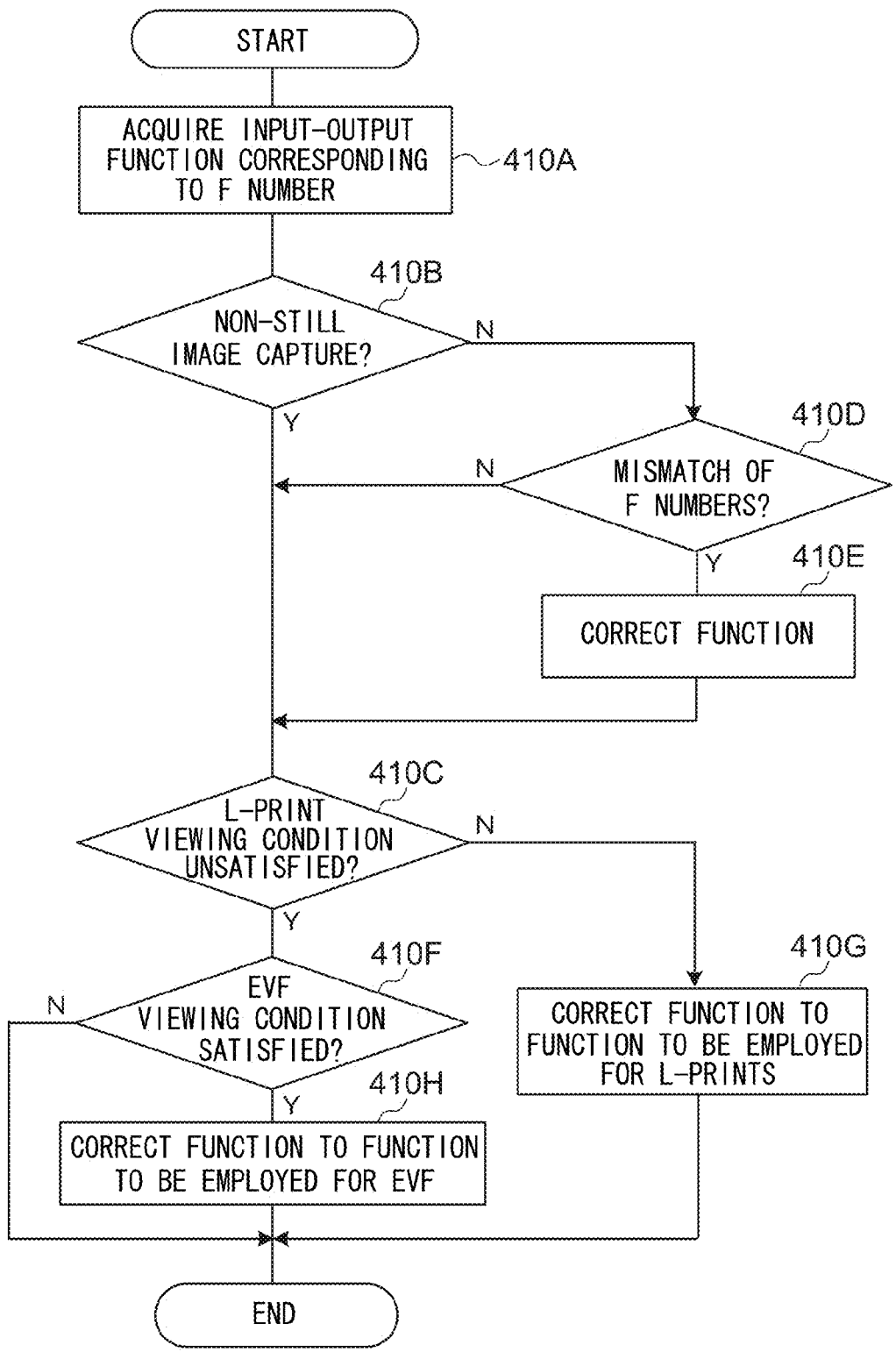
FIG. 18 is a flowchart illustrating an example of flow of function deciding processing performed in an image processor included in an imaging device according to the first exemplary embodiment.

At the next step 410, the image processor 28 performs function deciding processing. Function deciding processing is an example of processing included in processing to decide a parallax conversion coefficient of the present invention, and refers, for example, to processing to decide the input-output function f. FIG. 18 is a flowchart illustrating an example of flow of function deciding processing.

As illustrated in FIG. 18, at step 410A, the input-output function f corresponding to the F number currently set is acquired by the image processor 28. Reference here to the "input-output function f corresponding to the F number currently set" indicates, for example, the input-output function f illustrated in FIG. 10 as an example of a case in which the F number currently set as the F number to employ during live-view image capture is "1.4". It moreover indicates the input-output function f illustrated in FIG. 13 as an example of a case in which the F number currently set is "3.5". For convenience of explanation, a no visually discernable image displacement range Pout defined by the histogram illustrated in FIG. 12 is employed as an example of the no visually discernable image displacement range Pout applied to the input-output function f acquired at step 410A. The slopes of the input-output function f acquired at step 410A (for example the slopes of each of the functions F1 to F5) are examples of the non-use parallax conversion coefficient and the display-use coefficient according to the present invention. Although an example is given here in which an input-output function f corresponding to the F number is acquired, the present invention is not limited thereto, and a predetermined input-output function f that does not depend on the F number may be acquired.

At step 410B, determination is made by the image processor 28 as to whether or not the image capture currently instructed is non-still image capture. Affirmative determination is made at step 410B when the image capture currently instructed is non-still image capture, and processing transitions to step 410C. Negative determination is made at step 410B when the image capture currently instructed is still image capture, and processing transitions to step 410D.

At step 410D determination is made by the image processor 28 as to whether or not there is a mismatch between the F number currently set as the F number to be employed during still image capture and the F number currently set as the F number to be employed during live-view image capture. Affirmative determination is made at step 410D if there is a mismatch between the F number currently set as the F number to be employed during still image capture and the F number currently set as the F number to be employed during live-view image capture, and processing transitions to step 410E. Negative determination is made at step 410D if the F number currently set as the F number to be employed during still image capture matches the F number currently set as the F number to be employed during live-view image capture, and processing transitions to step 410C.

At step 410E, the input-output function f acquired at step 410A is corrected by the image processor 28 according to the F number currently set as the F number to be employed during still image capture. In cases in which the F number currently set as the F number to be employed during still image capture is higher than the F number currently set as the F number to be employed during live-view image capture, the image processor 28, for example, corrects the input-output function f such that the degree of emphasis is relaxed. Namely, the slope of the function F1 of the input-output function f acquired at step 410A (the gain of the output parallax relative to the input parallax) is made smaller than during live-view image capture. For example, in cases in which the F number during still image capture is "4.0" when the F number during live-view image capture is "1.4", a correction factor of "4.0/1.4" is used in the input-output function f to multiply the in-focus verifiable parallax range Pin illustrated in FIG. 10. The in-focus verifiable parallax range Pin illustrated in FIG. 10 is thereby widened.

Conversely, for example in cases in which the F number currently set as the F number to be employed during still image capture is lower than the F number currently set as the F number to be employed during live-view image capture, the function is corrected so as to tighten the degree of emphasis. Namely, the slope of the function F1 of the input-output function f acquired at step 410A is made greater than during live-view image capture. For example, in cases in which the F number during still image capture is "1.4" when the F number during live-view image capture is "3.5", a correction factor of "1.4/3.5" is used in the input-output function f to multiply the in-focus verifiable parallax range Pin illustrated in FIG. 13. The in-focus verifiable parallax range Pin illustrated in FIG. 13 is thereby narrowed.

As a general rule, during live-view image capture, the larger the F number the narrower the in-focus verifiable parallax range Pin, and a stronger degree of expansion is accordingly applied to parallax. For example, in the imaging device 100, in cases in which the F number employed during live-view image capture is "2.8", and the F number during still image capture is scheduled to be "2.8", parallax expansion is performed with the in-focus verifiable parallax range Pin set at "0.35", and main image capture is performed with the F number at "2.8". Moreover, for example, in cases in which the F number to be employed during live-view image capture is "4.0", and the F number during still image capture is scheduled to be "2.8", parallax expansion is performed with the in-focus verifiable parallax range Pin set at "0.25", and main image capture is performed with the F number at "2.8". Moreover, in cases in which the F number to be employed during live-view image capture is "5.6", and the F number during still image capture is scheduled to be "2.8", parallax expansion is performed with the in-focus verifiable parallax range Pin set at "0.18", and main image capture is performed with the F number at "2.8".

In cases in which still image capture is instructed during live-view image capture, the in-focus verifiable parallax range Pin expands if the F number for live-view image capture remains unchanged and the F number during still image capture becomes higher. The degree of parallax expansion is thereby weakened. For example, in the imaging device 100, in cases in which the F number to be employed during live-view image capture is "2.8", and the F number during still image capture is scheduled to be "2.8", parallax expansion is performed with the in-focus verifiable parallax range Pin set at "0.35", and main image capture is performed with the F number at "2.8". Moreover, for example, in cases in which the F number to be employed during live-view image capture is "2.8", and the F number during still image capture is scheduled to be "4.0", parallax expansion is performed with the in-focus verifiable parallax range Pin set at "0.50", and main image capture is performed with the F number at "4.0". Moreover, for example, in cases in which the F number to be employed during live-view image capture is "2.8", and the F number during still image capture is scheduled to be "5.6", parallax expansion is performed with the in-focus verifiable parallax range Pin set at "0.70", and main image capture is performed with the F number at "5.6".

Accordingly, the image processor 28 acquires live view images of successively captured frames by the image pick-up device 20 (an example of a successive frame image), and acquires a still image (an example of a single frame image) captured when still image capture is instructed. In cases in which still image capture has been instructed during live-view image capture, the parallax range of pixels of interest determined to be within the in-focus verifiable parallax range (image processing target pixels) is adjusted according to the F number. Namely, the parallax range is expanded in cases in which the F number during still image capture is larger than the F number during live-view image capture, and the parallax range is narrowed in cases in which the F number during still image capture is smaller than the F number during live-view image capture.

At step 410C, the image processor 28 determines as to whether an L-print viewing condition is unsatisfied. The L-print viewing condition indicates, for example, a condition expressing that the photographer prefers to view by an L-print rather than to view with the display section 213. An example of an L-print viewing condition is a condition of the total number of prints of L-print from a specific time being a specific number of prints (for example 500 prints) or greater. Namely, the photographer prefers to view by L-print if the total number of prints of L-print from a specific time is the specific number of prints or greater. Affirmative determination is made at step 410C in cases in which the L-print viewing condition is unsatisfied, and processing transitions to step 410F. Negative determination is made at step 410C if the L-print viewing condition is satisfied, and processing transitions to step 410G.

At step 410G, the input-output function f acquired at step 410A, or the input-output function f corrected at step 410E, is corrected by the image processor 28 to the input-output function f to be employed for L-prints, then the function deciding processing is ended. The input-output function f to be employed for L-prints indicates, for example, an input-output function fin which the range of the in-focus verifiable parallax range Pin for the input-output function f acquired at step 410A, or the input-output function f corrected at step 410E, is widened to a predetermined range. The no visually discernable image displacement range Pout and the visually discernable image displacement range Pout' of the input-output function f are unchanged between before and after widening the range of the in-focus verifiable parallax range Pin. The reason that the range of the in-focus verifiable parallax range Pin is widened in this manner is so as not to cause problems in cases in which images are viewed shrunk like L-prints, even if the input parallax range is expanded further than in cases in which images are viewed with the display section 213.

At step 410F, determination is made by the image processor 28 as to whether or not EVF viewing condition has been satisfied. The EVF viewing condition is, for example, a condition indicating that the user is currently using the EVF 248. Determination as to whether or not the user is using the EVF 248 may, for example, be performed by determining whether or not it has been determined that the finder eyepiece 242 is being used based on the detection result of the eyepiece detection section 37. Namely, it is determined that the user is using the EVF 248 when it is determined that the finder eyepiece 242 is being used, and it is determined that the user is not using the EVF 248 when it is determined that the finder eyepiece 242 is not being used. Negative determination is made at step 410F in cases in which the EVF viewing condition is not satisfied, and the function deciding processing is ended. Affirmative determination is made at step 410F in cases in which the EVF viewing condition is satisfied, and processing transitions to step 410H.

At step 410H, the input-output function f acquired at step 410A, or the input-output function f corrected at step 410E, is corrected by the image processor 28 to the input-output function f to be employed for EVF use, then the function deciding processing is ended. The EVF-use input-output function f indicates, for example, an input-output function f that widens the no visually discernable image displacement range Pout to the no visually discernable image displacement range Pout defined by the histogram illustrated in FIG. 11, without changing the in-focus verifiable parallax range Pin and the outside in-focus verifiable parallax range Pin' for the input-output function f. The slope of the input-output function f widened to the no visually discernable image displacement range Pout (for example each of the slopes of the functions F1 to F5) is an example of an in-use parallax conversion coefficient according to the present invention.

If, for example, a no visually discernable image displacement range Pout defined by the histogram illustrated in FIG. 11 were to be applied as the no visually discernable image displacement range Pout in the input-output function f acquired at step 410A, then the processing of step 410H would not be required. In place thereof, when negative determination is made at step 410F, then additional processing is performed to correct the input-output function f to an input-output function fin which the no visually discernable image displacement range Pout has been shrunk to the no visually discernable image displacement range Pout defined by the histogram illustrated in FIG. 12. Note that the in-focus verifiable parallax range Pin and the outside in-focus verifiable parallax range Pin' remain unaltered between before and after shrinking the range of the no visually discernable image displacement range Pout.

Returning to FIG. 16, at step 412, determination is made by the image processor 28 as to whether or not the pixel of interest set at step 404 is within the in-focus verifiable parallax range. Affirmative determination is made at step 412 when within the in-focus verifiable parallax range, and processing transitions to step 414. Negative determination is made at step 412 when outside the in-focus verifiable parallax range, and processing transitions to step 416. Determination is made here as to whether or not pixel of interest is within the in-focus verifiable parallax range based on the parallax computed at step 408. There is, however, no limitation thereto, and the any method may be applied as long as it is a method enabling determination as to whether or not the pixel of interest is within the in-focus verifiable parallax range. Since the pixel of interest determination result also applies to the pixel at the corresponding point of the right eye image, an example is given in which determination is only made as to whether or not the pixel of interest is within the in-focus verifiable parallax range, however, determination may be made as to whether or not the right eye image pixel corresponding to the pixel of interest is also within the in-focus verifiable parallax range.

The processing of steps 414, 416 is an example of processing included in processing to decide on the parallax conversion coefficient according to the present invention. At step 414, the image processor 28 acquires the function F1 as the function corresponding to the parallax computed at step 408 from the input-output function f determined at step 410, then processing transitions to step 418. At step 416, the image processor 28 acquires the function corresponding to the parallax computed at step 408 from the functions F2 to F4 included in the outside in-focus verifiable parallax range Pin' of the input-output function f determined at step 410, then processing transitions to step 418.

At step 418 a filter coefficient is decided by the image processor 28 corresponding to the output parallax derived using the function acquired at step 414 or at step 416. The image processor 28 first derives a parallax y equivalent to the output parallax using the function acquired at step 414 or at step 416. Namely, the parallax computed at step 408 as the input parallax is converted using the function acquired on at step 414 or at step 416 into the parallax γ as the output parallax. A phase shift amount μ (in pixels) corresponding to the parallax γ is then derived. The phase shift amount μ may be uniquely determined by a function such as the example illustrated in FIG. 19 (the graph of the solid line or the broken line). The solid line graph illustrated in FIG. 19 illustrates the phase shift amount μ for the left eye image, with parallax γ for an imaging subject further away than an in-focus imaging subject (parallax 0) having a plus sign, and parallax γ for an imaging subject nearer than the in-focus imaging subject having a minus sign. A phase shift amount μ to the right is plus, and a phase shift amount μ to the left is minus. As illustrated in the broken line graph in FIG. 19, the phase shift amount μ for the right eye image takes the opposite sign to the phase shift amount μ for the left eye image.

In the example illustrated in FIG. 19, conversion is performed to the phase shift amount μ, such that the sign of the output parallax (in pixels) decided by the input-output function f does not change, by multiplying a slope ε(>0) by the parallax γ in a specific pixel number range (for example ±P1). For parallax γ exceeding the specific pixel number range, the phase shift amount μ is constant such that the slope ε is "ε=0", on the assumption that a miscalculation occurred in the parallax measurement results. In the first exemplary embodiment, the range of output parallax defined by the functions F1, F2, F3 included in the input-output function f is applied as the range of parallax γ for "ε>0". Moreover, the range of output parallax defined by the functions F4, F5 included in the input-output function f is applied as the range of parallax γ for "ε=0" (the output parallax range in which the phase shift amount μ is constant).

Figure 15B:
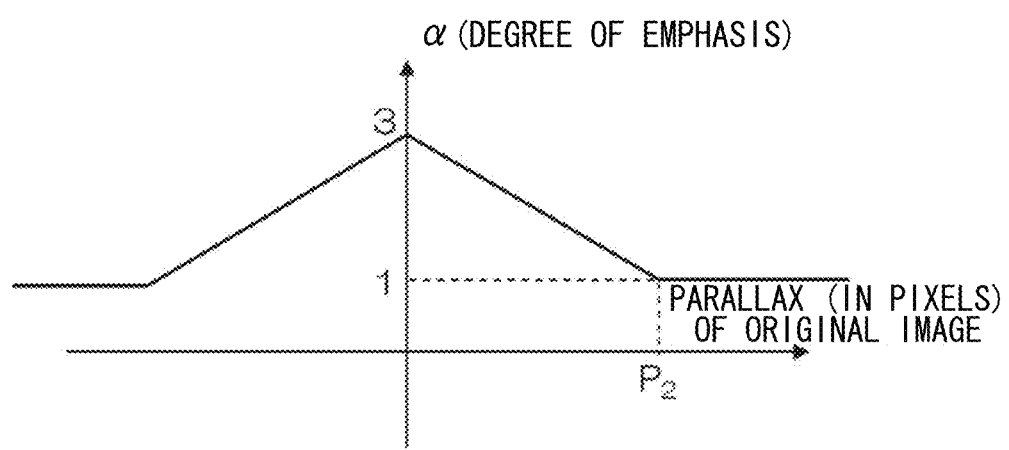
FIG. 15B is a graph schematically illustrating degree of edge emphasis.

Then the image processor 28 computes the filter coefficient of the filters $F_L$, $F_R$ according to [Equation 1] based on the phase shift amount μ derived according to the function illustrated as an example in FIG. 19, a preset standard deviation σ, and the edge emphasis strength α (see FIG. 15A and FIG. 15B). In the first exemplary embodiment an example is given in which the filter coefficients of the filters $F_L$, $F_R$ are computed using the [Equation 1]; however the present invention is not limited thereto. For example, a look up table (LUT) pre-stored with sets of filter coefficients associated with output parallaxes, phase shift amounts, or the like, may be prepared, and the filters $F_L$, $F_R$ decided by reading out the corresponding set of filter coefficients based on the output parallaxes or the like.

At step 420, image processing is performed by the image processor 28 on the pixel group extracted at step 406 and the corresponding pixel group (for example, the pixel group extracted with reference to the corresponding point of the right eye image corresponding to the pixel of interest (i, j) set at step 404).

At step 420, for example, the image processor 28 first computes the pixel value of the pixel of interest (i, j) by performing filter processing using the filter $F_L$ of kernel size the same as the block size for the pixel group (block) extracted at step 406. It then computes the pixel value of the corresponding point of the right eye image by performing filter processing using the filter $F_R$ of kernel size the same as the block size for the pixel group extracted with reference to the corresponding point of the right eye image corresponding to the pixel of interest (i, j) set at step 404.

The image processor 28 then disposes (maps) the pixel value of the pixel of interest (i, j) of the left eye image and the pixel value of the corresponding point pixel in the right eye image that have been filter-processed in the above manner to positions shifted by phase shift amount μ from their original positions.

Figures 20A, 20B:
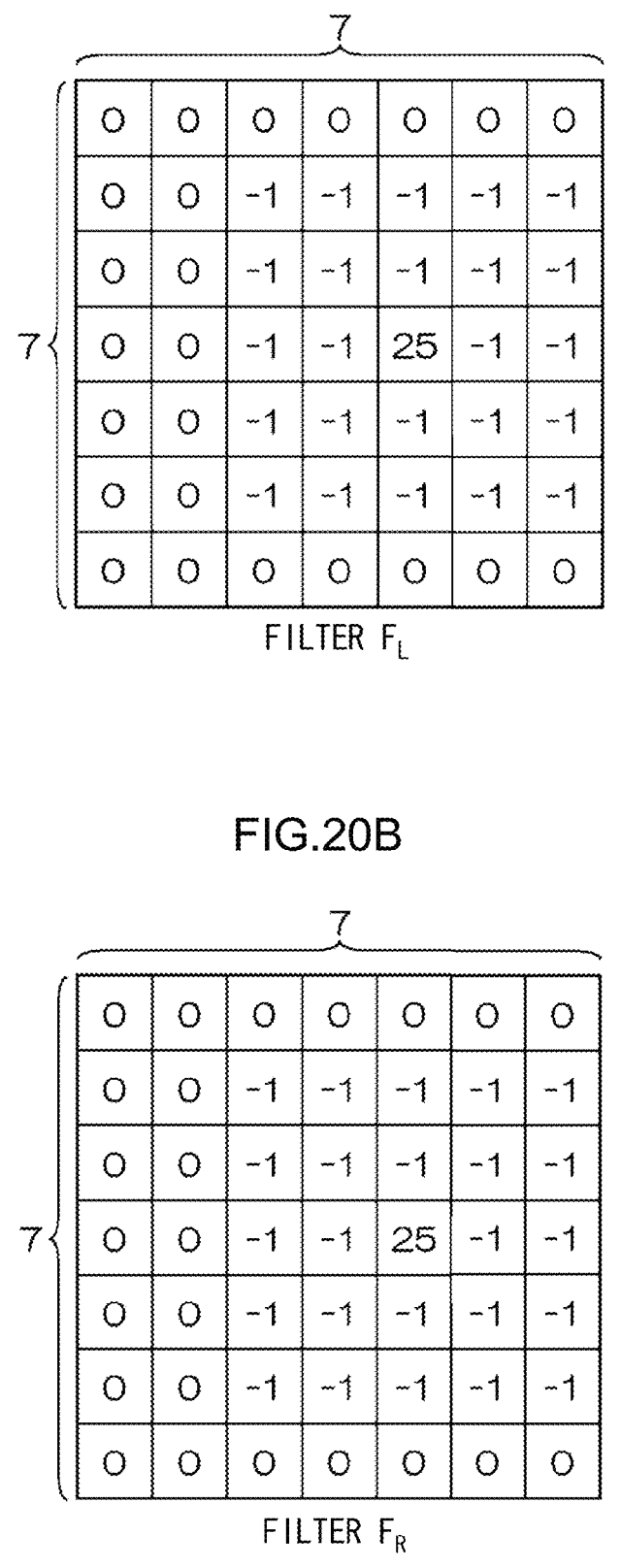

If the block size (Cx×Cy) here is, for example, 7×7 pixels, then the kernel size of the filters $F_L$, $F_R$ is also 7×7 pixels, such as in the example illustrated in FIG. 20A and FIG. 20B. Then, filter processing is performed with the $F_L$, $F_R$ without releasing the left eye image pixel group (block) and the right eye image pixel group (block) for which the corresponding points where detected and the parallax y was computed using the block matching method. This thereby enables a reduction to be made in the amount of memory employed, and processing can also be speeded up.

At the next step 422, an image is stored by the image processor 28 storing pixel values obtained for each pixel by the image processing performed at step 420 in a specific storage region (for example the memory 26), and then processing proceeds to step 424.

At step 424, determination is made by the image processor 28 as to whether or not the filter processing has been completed for all pixels of the left eye image. Affirmative determination is made at step 424 if the filter processing has been completed for all pixels in the left eye image, and processing transitions to step 426. Negative determination is made at step 424 if filter processing has not been completed for all pixels in the left eye image, and processing transitions to step 404.

At step 426, after the image stored in the specific storage region at steps 400, 422 has been output by the image processor 28 to a specific output destination, the present image processing is ended. As the "specific output destination", an example is the display controller 36, and, in cases in which output to an external device is instructed by a photographer or the like through the operation section 14, the "specific output destination" may be the external I/F 39.

Figure 21A:
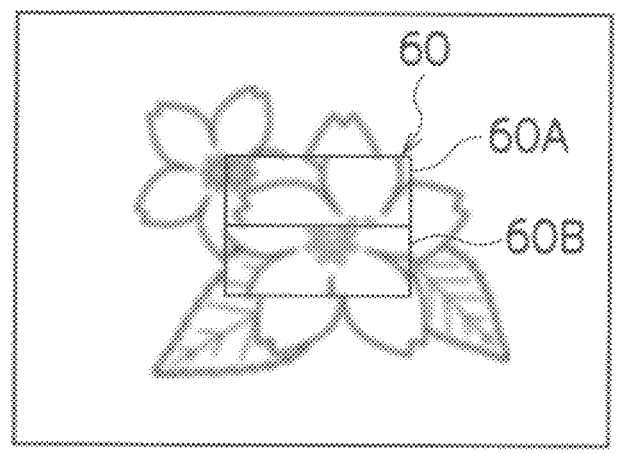
FIG. 21A is a screen shot diagram illustrating an example of a live-view image displayed on a display device of an imaging device according to first exemplary embodiment, when in a non-focused state.
Figure 21B:
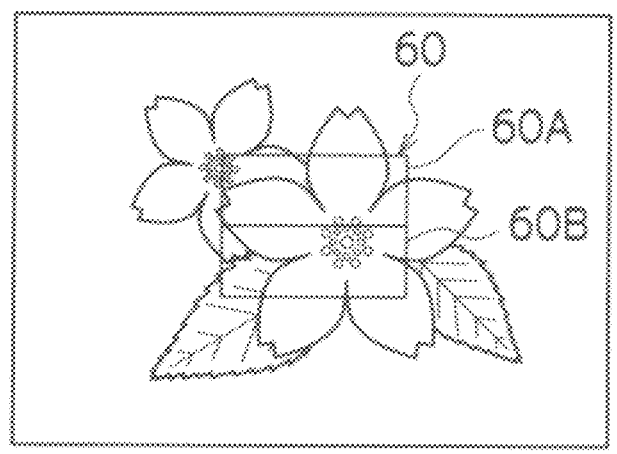
FIG. 21B is a screen shot diagram illustrating an example of a live-view image displayed on a display device of an imaging device according to first exemplary embodiment, when in a focused state.

When the image processing illustrated in FIG. 16 has been performed by the image processor 28, a live view image, such as the example in FIG. 21A and FIG. 21B, is displayed on the display section 213 and the HYBRID FINDER 220. In the example illustrated in FIG. 21A and FIG. 21B, a split-image is displayed at the center of the screen in a region inside a frame 60, and a normal image is displayed in the region outside the frame 60.

Namely, the first and second pixel groups are set according to the size of the frame 60. The split-image is broadly divided into an image (parallax image) of the upper half 60A of the frame 60 of an image corresponding to the first image output from the first pixel group, and an image (parallax image) of the lower half 60B of the frame 60 of an image corresponding to the second image output from the second pixel group.

In cases in which the imaging subject corresponding to the image in the frame 60 is not in focus in the imaging lenses 16, the image is displaced in the parallax generation direction (for example the horizontal direction) at a boundary between the parallax image of the upper half 60A and the parallax image of the lower half 60B in the split-image, as illustrated in FIG. 21A. The image is also displaced in the parallax generation direction at the boundary between the normal image and the split-image. This shows that phase difference is occurring, and a photographer is able to visually discern that phase difference has occurred, and able to visually discern the parallax generation direction, using the split-image.

However, in cases in which the imaging subject corresponding to the image in the frame 60 is in focus in the imaging lenses 16, the image is aligned at the boundary between the parallax image of the upper half 60A and the parallax image of the lower half 60B in the split-image as illustrated in FIG. 21B. The image is also aligned at the boundary between the normal image and the split-image. This shows that phase difference has not occurred, and a photographer is able to visually discern that phase difference has not occurred, using the split-image.

Thus the photographer is able to check the state of focus of the imaging lenses 16 using the split-image displayed on the display section 213. Moreover, in manual focus mode, the focus misalignment amount (defocus amount) can be made zero by manual operation of a focus ring 302 of the imaging lenses 16. Moreover, a color image can be displayed that does not have a mismatch in color between the normal image and split-image, enabling manual focusing adjustment by a photographer to be assisted by using a color split-image.

Figure 22:
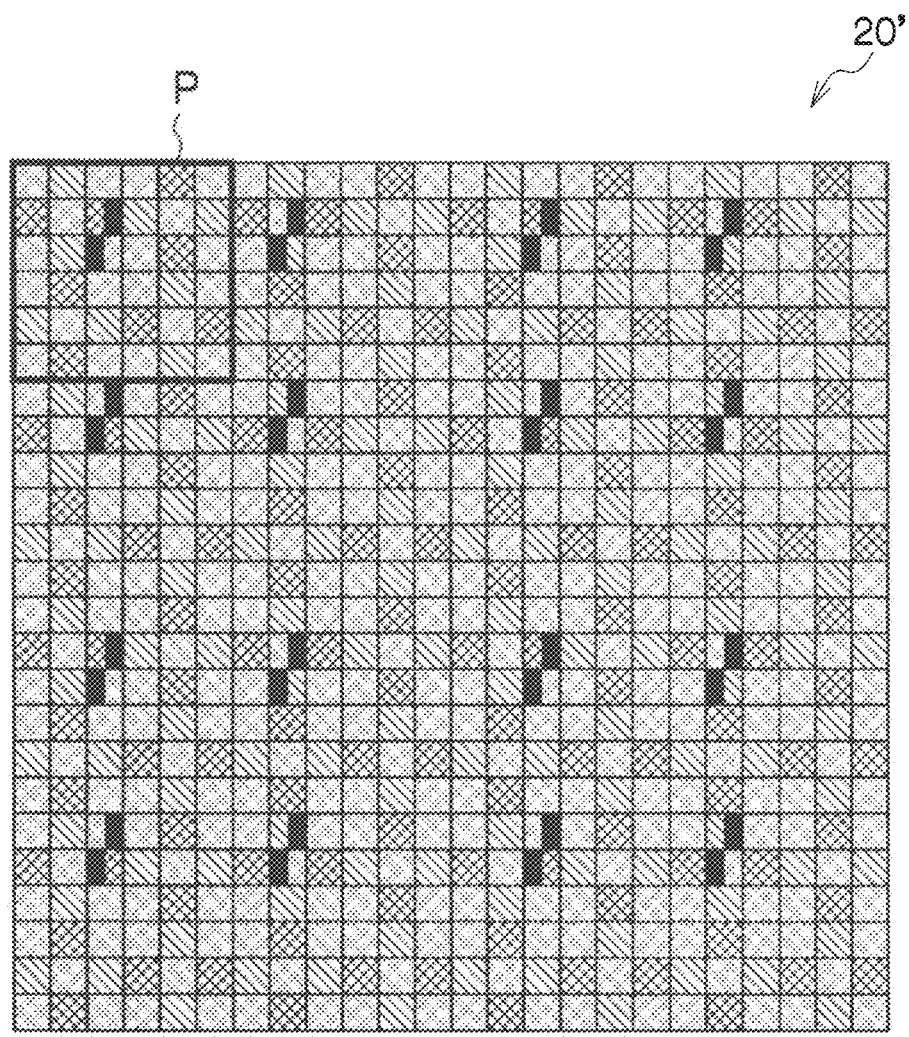
FIG. 22 is a schematic diagram illustrating another configuration example of an image pick-up device included in an imaging device according to the first exemplary embodiment.

A modified example of the image pick-up device 20 is illustrated in FIG. 22, particularly illustrating an example of a color filter array and an example of the placement of light-blocking members. The color filter array of the image pick-up device 20' illustrated in FIG. 22 includes a basic array pattern P (the pattern indicated by the bold outline) formed from a square array pattern corresponding to 6×6 pixels, with the basic array pattern P disposed repeating in the horizontal direction and the vertical direction. Namely, the color filter array is arrayed with color filters for each of R, G, B at a specific periodicity.

The image pick-up device 20', similarly to the image pick-up device 20 illustrated in FIG. 4, includes a first pixel group, a second pixel group, and a third pixel group. The first pixel group has light to the left half of the light receiving faces blocked by a light-blocking member, and the second pixel group has light to the right half of the light receiving faces blocked by a light-blocking member. The third pixel group is not provided with a light-blocking member.

Figure 23A:
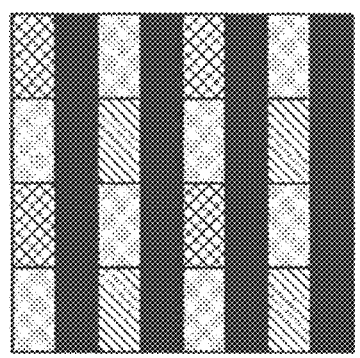
FIG. 23A is a schematic diagram illustrating an example of a first pixel group in the image pick-up device illustrated in FIG. 22.
Figure 23B:
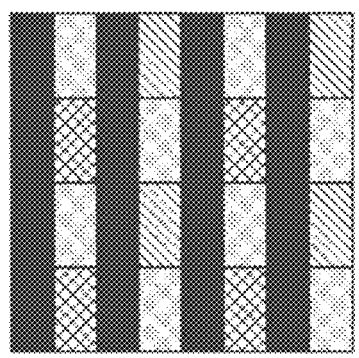
FIG. 23B is a schematic diagram illustrating an example of a second pixel group in the image pick-up device illustrated in FIG. 22.

FIG. 23A and FIG. 23B only illustrate the first pixel group and the second pixel group included in the image pick-up device 20' illustrated in FIG. 22. The color filter arrays for the first pixel group and the second pixel group are each respectively Bayer arrays such as those illustrated in FIG. 23A and FIG. 23B. Namely, some of the pixels from out of all the pixel groups of the image pick-up device 20' are placed as phase difference pixels, such that the color filter arrays of the first pixel group and the second pixel group are each Bayer arrays.

The color filter array of the image pick-up device 20' illustrated in FIG. 22 includes a basic array pattern P of 6×6 pixels, and is more complicated than a Bayer array with a basic array pattern of 2×2 pixels. The signal processing such as for synchronization processing also becomes more complicated, however signal processing such as for synchronization processing to generate a split-image can be performed easily by placing the phase difference pixels such that the arrays of the color filters are respectively Bayer arrays, as described above.

Examples are given of color filter arrays such as those illustrated in FIG. 23A and FIG. 23B in which the phase difference pixels are placed so as to form Bayer arrays, however the color filter array illustrated in FIG. 22 may also be adopted in which the phase difference pixels are placed on every sixth pixel in the horizontal direction and vertical direction (in pairs of first and second pixels). This thereby enables the color filter arrays of the first pixel group and the second pixel group to be color filter arrays the same as in the original RAW image.

As explained above, the imaging device 100 according to the first exemplary embodiment includes first and second pixel groups on which respective images are formed by pupil-divided light rays that have passed through the exit pupil of the imaging lenses 16 on the left side and the right side of the optical axis (examples of subject images that have passed through first and second regions). The image processor 28 that is an example of an image acquisition section acquires the left eye image and the right eye image corresponding to the first image and the second image output from the first pixel group and the second pixel group (step 402). The image processor 28 that is an example of a parallax computation section computes the parallax representing the displacement amount between each of the pixels in the left eye image and each of the pixels in the right eye image (step 408). Then the image processor 28 that is an example of a first determination section determines whether or not the image processing target pixel is within the in-focus verifiable parallax range (step 412). The image processor 28 that is an example of a coefficient decision section decides on an input-output function f with a coefficient (for example a slope) that is an example of a parallax conversion coefficient for each of the target pixels in the left eye image and the right eye image (steps 410, 414, 416). When determined to be within the in-focus verifiable parallax range, the input-output function f converts the computed input parallax to an output parallax of a no visually discernable image displacement range Pout (an example of a parallax such that the split-image is visually confirmable to be within the in-focus verifiable parallax range). Moreover, when determined to be outside the in-focus verifiable parallax range, the input-output function f converts the computed input parallax to the output parallax visually discernable image displacement range Pout' (an example of a parallax such that the split-image is visually confirmable to be outside the in-focus verifiable parallax range). Moreover, the image processor 28 performs image processing on the target pixels based on the input-output function f (step 420). This thereby enables excessive or insufficient parallax emphasis to be avoided more than in cases without such configuration.

Moreover, in the imaging device 100 according to the first exemplary embodiment, the parallax of the no visually discernable image displacement range Pout is parallax evaluated to be in a focused state by sensory tests by plural test subjects. This thereby enables the level of parallax emphasis within the in-focus verifiable parallax range to be determined more appropriately than in cases without such configuration.

Moreover, in the imaging device 100 according to the first exemplary embodiment, the parallax of the visually discernable image displacement range Pout' is a parallax evaluated to be in a non-focused state by sensory tests by plural test subjects. This thereby enables the level of parallax emphasis outside of the in-focus verifiable parallax range to be determined more appropriately than in cases without such configuration.

Moreover, in the imaging device 100 according to the first exemplary embodiment, the image processor 28 determines whether or not the image processing target pixel is within a specific parallax range wider than the in-focus verifiable parallax range (step 412). In cases in which the image processing target pixel is determined to be within the specific parallax range (for example at the minus side pre-conversion parallax boundary or above, and at the plus side pre-conversion parallax boundary or below), a function is employed to expand the parallax of the image processing target pixel. This thereby enables high precision suppression of instances of excessive or insufficient parallax emphasis from occurring in the specific parallax range that is wider than the in-focus verifiable parallax range.

In the imaging device 100 according to the first exemplary embodiment, when determined to be outside the in-focus verifiable parallax range, the input parallax is converted to an output parallax expanded according to the slope of the functions F2, F3 (an example of a an expansion ratio of a predetermined expansion ratio or below). This thereby enables higher precision suppression of instances of excessive or insufficient parallax emphasis from occurring outside the in-focus verifiable parallax range than in cases without such configuration.

In the imaging device 100 according to the first exemplary embodiment, the slope of the function F2 is determined based on the intersection between the plus side pre-conversion parallax boundary and the plus side post-conversion parallax boundary (an example of a maximum value of parallax visually discernable to be within the in-focus verifiable parallax range) and a particular plus side input parallax. Moreover, the slope of the function F3 is determined based on the intersection between the minus side pre-conversion parallax boundary and the minus side post-conversion parallax boundary (an example of the minimum value of parallax visually discernable to be within the in-focus verifiable parallax range) and a particular minus side input parallax. This thereby enables the slopes of the functions F2, F3 to be more easily determined so as not to cause excessive or insufficient parallax emphasis outside the in-focus verifiable parallax range than in cases without such configuration.

In the imaging device 100 according to the first exemplary embodiment, in cases in which the input parallax of target pixels determined to be outside the in-focus verifiable parallax range are the particular input parallax or greater, the unmodified input parallax is made the output parallax by the functions F4, F5 (an example of converting to a parallax of a particular input parallax or lower). This thereby enables excessive parallax emphasis outside the in-focus verifiable parallax range to be avoided better than in cases without such configuration.

In the imaging device 100 according to the first exemplary embodiment, the image processor 28 determines whether or not the image processing target pixel is within the in-focus verifiable parallax range according to the inequality Pe<κ<We/Wc (in pixels). This thereby enables determination of whether or not the image processing target pixel is within the in-focus verifiable parallax range with higher precision than in cases without such configuration.

In the imaging device 100 according to the first exemplary embodiment, the in-focus verifiable parallax range Pin (an example of a range of parallax of the target pixels determined to be within the in-focus verifiable parallax range) is made narrower as the F number of the imaging lenses 16 becomes higher. This thereby enables better suppression of instances of excessive or insufficient emphasis of parallax from occurring depending on the F number than in cases without such configuration.

In the imaging device 100 according to the first exemplary embodiment, the image processor 28 further acquires a live view image captured by successive frames (an example of a successive frame image) together with acquiring a still image (an example of a single frame image) captured when single frame image capture has been instructed. The in-focus verifiable parallax range is then made narrower as the F number (an example of an imaging lenses aperture number) becomes higher when still image capture has not been instructed. This thereby enables parallax emphasis to be performed without excess or insufficiency better when still image capture has not been instructed than in cases without such configuration.

In the imaging device 100 according to the first exemplary embodiment, the in-focus verifiable parallax range is determined according to the F number to be employed during still image capture when still image capture has been instructed. This thereby enables parallax emphasis to be performed without excess or insufficiency when still image capture has been instructed better than in cases without such configuration.

In the imaging device 100 according to the first exemplary embodiment, the in-focus verifiable parallax range when still image capture has been instructed is made wider as the F number becomes higher in cases in which the F number for when still image capture has been instructed is higher than the F number employed during live-view image capture. It is moreover narrowed as the F number becomes lower in cases in which the F number for when still image capture has been instructed is lower than the F number employed during live-view image capture. This thereby enables better suppression of instances of excessive or insufficient emphasis of parallax according to F number from occurring even in cases in which still image capture has been instructed than in cases without such configuration.

In the imaging device 100 according to the first exemplary embodiment, the no visually discernable image displacement range Pout and the visually discernable image displacement range Pout' are fixed. This thereby enables instances in which the degree of emphasis of parallax differs according to the in-focus verifiable parallax range to be avoided better than in cases without such configuration. Preferably the no visually discernable image displacement range Pout and the visually discernable image displacement range Pout' are fixed for each image output destination.

In the imaging device 100 according to the first exemplary embodiment, the input-output function f is a continuous function that selectively outputs the parallax of the no visually discernable image displacement range Pout or the parallax of the visually discernable image displacement range Pout' according to the input parallax. This thereby enables the degree of emphasis of parallax to be more easily predicted than in cases without such configuration.

In the imaging device 100 according to the first exemplary embodiment, the function F1 that is an example of a first linear function is employed as the input-output function f in the in-focus verifiable parallax range Pin. This thereby enables the degree of emphasis of parallax to be more easily predicted in the in-focus verifiable parallax range Pin than in cases without such configuration.

In the imaging device 100 according to the first exemplary embodiment, the functions F2, F3 that are examples of second linear functions contiguous to the function F1 and with shallower gradient than the function F1 are employed as the input-output function f in the outside in-focus verifiable parallax range Pin'. This thereby enables sudden change in parallax emphasis to be suppressed better than in cases without such configuration. Reference here to "shallower gradient" means, for example, a shallower gradient on the presumption that it is a slope whose sign does not change from the sign of the slope of the function F1.

In the imaging device 100 according to the first exemplary embodiment, the functions F2, F3, the function F4 that is an example of an identity function contiguous to the function F2, and the function F5 that is an example of an identity function contiguous to the function F3 are employed as the input-output function f in the outside in-focus verifiable parallax range Pin'. This thereby enables excessive emphasis of parallax to be suppressed better in the outside in-focus verifiable parallax range Pin' than in cases without such configuration.

The imaging device 100 according to the first exemplary embodiment determines the input-output function f according to the type of viewing medium to view the image obtained by image processing. This thereby enables more appropriate determination of the degree of parallax emphasis according to the type of viewing medium than in cases without such configuration.

In the imaging device 100 according to the first exemplary embodiment, the split-image that is an example of a focus verification image based on the first image and the second image is generated by the split image processing section 32. This thereby enables whether or not the focused state has been achieved to be more easily ascertained than in cases without such configuration.

In the imaging device 100 according to the first exemplary embodiment, the split-image is an image corresponding to an image displaced along the parallax generation direction by a phase shift amount μ according to the output parallax after the first image and the second image have been converted by the input-output function (an example of a displacement amount). This thereby enables the magnitude of parallax and the parallax generation direction to be estimated better than in cases without such configuration.

In the imaging device 100 according to the first exemplary embodiment, the image processor 28 acquires the normal image and the display device displays the image. Then the display controller 36 displays the normal image acquired by the image processor 28 on the display device. The display controller 36 moreover displays the split-image on the display device within the display region of the normal image. This thereby enables an image in the focused state to be obtained more easily than in cases without such configuration.

In the imaging device 100 according to the first exemplary embodiment, the image pick-up device 20 includes the third pixel group, and the image processor 28 generates a normal image based on the third image output from the third pixel group. This thereby enables the quality of the normal image to be improved compared to cases not adopting the present configuration.

Explanation has been given in the first exemplary embodiment of an example in which parallax based on evaluation results from sensory tests with plural test subjects is employed as the output parallax derived with the input-output function f; however there is no limitation thereto. For example, a parallax that is visually discernable by the photographer himself may be instructed through the operation section 14.

In the first exemplary embodiment, the input-output function f is a continuous function, however there is no limitation thereto, and a non-continuous function may be employed. Examples of such cases are making the function corresponding to the function F1, and each of the functions corresponding to the functions F2, F3, non-continuous in the output parallax direction illustrated in FIG. 10, or making each of the functions corresponding to the functions F1 to F5 non-continuous in the output parallax direction illustrated in FIG. 10.

In the first exemplary embodiment, the functions F1 to F5 are linear functions; however there is no limitation thereto and a non-linear function may be applied in place of one or more of the functions F1 to F5.

Moreover, although in the first exemplary embodiment the functions F4, F5 are identity functions, there is no limitation thereto, and the slope of at least one of the functions F4, F5 may be a linear function with a slope of 0 or more, but less than 1.

In the first exemplary embodiment, explanation has been given of an embodiment in which the input parallax is converted into the output parallax by employing the input-output function f, however the input parallax may be converted into the output parallax by employing a LUT. In such cases, the output parallax corresponding to the input parallax may be derived by associating input parallaxes, coefficients including the input-output function f (for example, the gradient of each of the functions F1 to F5), and output parallaxes.

In the first exemplary embodiment the L-print viewing condition is employed, however a viewing condition according to the type of viewing medium may be applied if the viewing medium is anything other than an L-print.

In the first exemplary embodiment described above, an example is given of an interchangeable lens digital camera without a reflex mirror, however there is no limitation thereto, and the present invention may be applied to an image capture device with integral lens.

In the first exemplary embodiment described above, an example is given of the imaging device 100 including the display section 213 and the EVF 248, however there is no limitation thereto, and either the display section 213 or the EVF 248 may be included.

In the first exemplary embodiment, an example has been given of a split-image divided in two in the up-down direction, however there is no limitation thereto, and application may be made of an image multiply divided in the left-right direction or a diagonal direction as a split-image.

Figure 24:
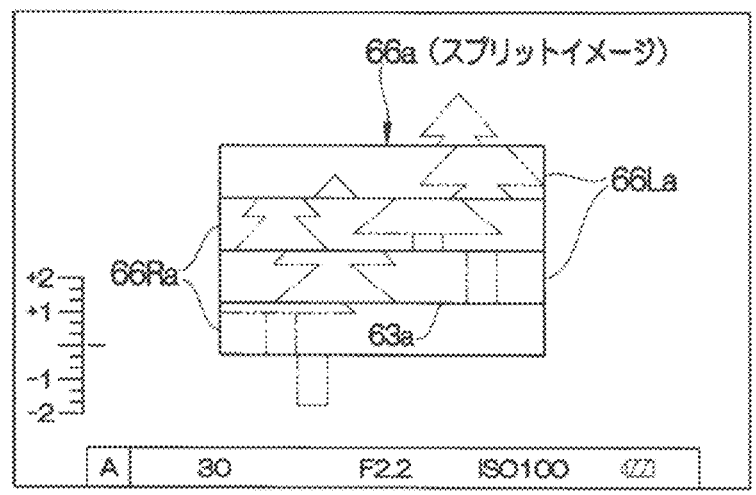
FIG. 24 is a schematic diagram illustrating a modified example of a split-image according to the first exemplary embodiment, in which the split-image is formed by dividing a first image and a second image into alternately arranged odd-numbered lines and even-numbered lines.

A split-image 66*a* illustrated in FIG. 24 is divided into odd numbered lines and even numbered lines by plural dividing lines 63*a* parallel to the horizontal direction. In the split-image 66*a,* line shaped (for example strip shaped) phase difference images 66La generated based on the output signal output from the first pixel group are displayed on the odd numbered lines (or on the even numbered lines). Line shaped (for example strip shaped) phase difference images 66Ra generated based on the output signal output from the second pixel group are displayed on the even numbered lines.

Figure 25:
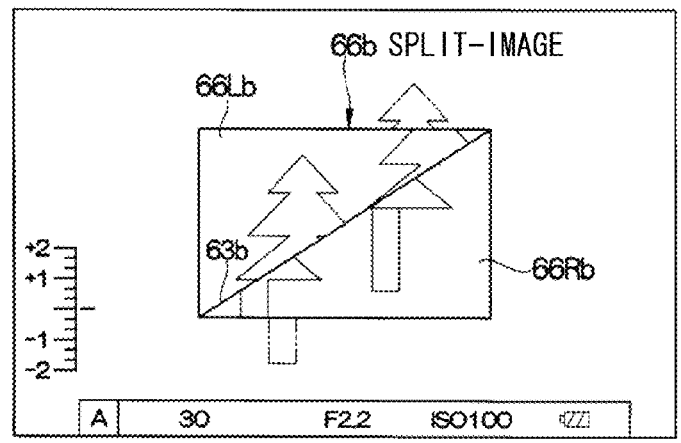
FIG. 25 is a schematic diagram illustrating a modified example of a split-image according to the first exemplary embodiment, in which the split-image is divided by a dividing line with a slope angled with respect to the horizontal direction.

A split-image 66*b* illustrated in FIG. 25 is divided into two by a dividing line 63*b* with slope angled with respect to the horizontal direction (for example a diagonal line of the split-image 66*b*). In the split-image 66*b,* a phase difference image 66L*b* generated based on the output signal output from the first pixel group is displayed in one region. A phase difference image 66R*b* generated based on the output signal output from the second pixel group is displayed in the other region.

Figure 26A:
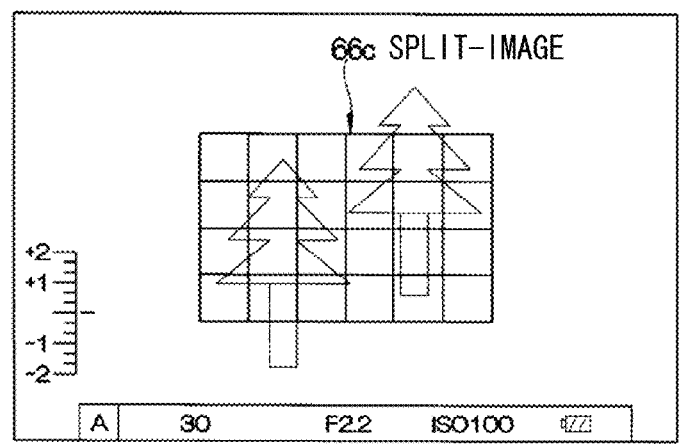
FIG. 26A is a schematic diagram illustrating a modified example of a split-image according to the first exemplary embodiment, in which the split-image is divided by dividing lines in a lattice pattern.
Figure 26B:
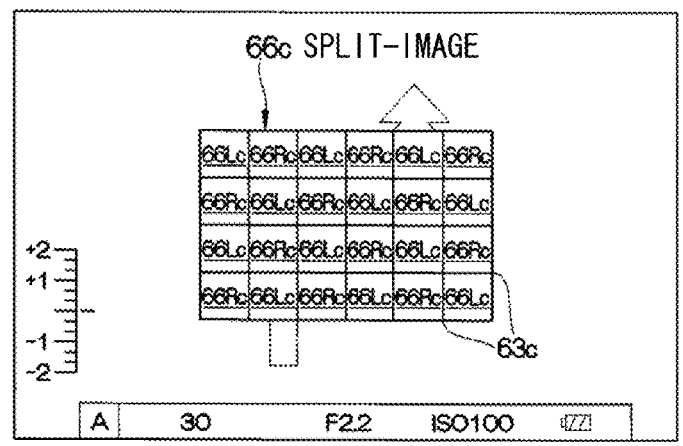
FIG. 26B is a schematic diagram illustrating a modified example of a split-image according to the first exemplary embodiment, in which the split-image is formed in a chess board pattern.

A split-image 66*c* illustrated in FIG. 26A and FIG. 26B is divided by dividing lines 63*c* forming a lattice pattern parallel to the horizontal direction and the vertical direction, respectively (see FIG. 26A). In the split-image 66*c,* a phase difference image 66L*c* generated based on the output signals output from the first pixel group is displayed arranged in a chess board pattern (checkered pattern). A phase difference image 66R*c* generated based on the output signals output from the second pixel group is displayed arranged in a chess board pattern (see FIG. 26B).

Moreover, there is no limitation to a split-image, and another focus verification image may be generated from the two phase difference images, and the focus verification image displayed. For example, the two phase difference images may be superimposed on each other in a combined display, so as to display as a double image when not in focus and display as a clear image when in a focused state.

The flow of image output processing (see FIG. 16), and the flow of function deciding processing (see FIG. 18) explained in the first exemplary embodiment are merely examples thereof. It therefore goes without saying that unnecessary steps may be omitted, new steps may be added, and the processing sequence may be switched within a range not departing from the spirit thereof. Each processing in the image output processing, and each processing in the function deciding processing may be implemented by a software configuration using a computer by executing a program, or may be implemented by a hardware configuration. Implementation may also be made using a combination of a hardware configuration and a software configuration.

Programs may be pre-stored in a specific storage region (for example the memory 26) in cases in which at least one out of the image output processing, and the function deciding processing is implemented by a computer executing a program. Initial storage in the memory 26 is not always necessary. For example, a program may first be stored on a freely selectable "portable storage medium" such as a flexible disk, called a FD, a CD-ROM, a DVD disk, a magneto optical disk, or an IC card, employed connected to a computer. A computer may then acquire and execute the program from such a portable storage medium. Each program may also be stored in advance on another computer, server device, or the like connected to a computer through the internet, a Local Area Network (LAN), or the like, such that the computer acquires and executes such programs therefrom.

Second Exemplary Embodiment

In the first exemplary embodiment, an example is given of the imaging device 100, however modified examples of the imaging device 100 include mobile terminal devices such as, for example, mobile phones and smartphones including a camera function, personal digital assistants (PDAs), mobile gaming devices, or the like. Detailed explanation follows regarding an example of a smartphone, with reference to the drawings.

Figure 27:
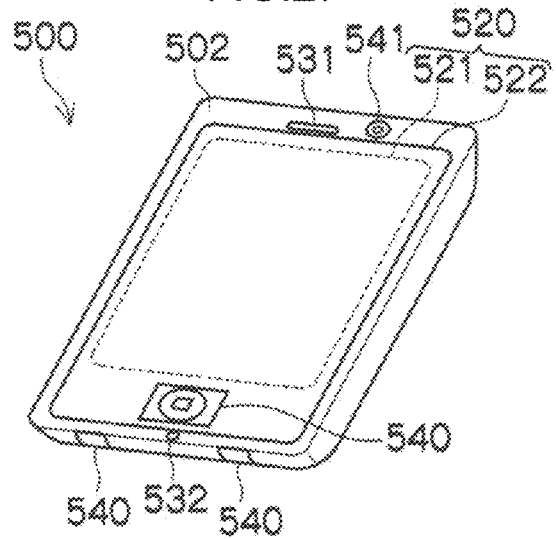
FIG. 27 is a perspective view illustrating an example of the external appearance of a smartphone according to a second exemplary embodiment.

FIG. 27 is a perspective view illustrating an example of the external appearance of a smartphone 500. The smartphone 500 illustrated in FIG. 27 includes a flat plate shaped casing 502, and a display and input section 520 provided on one face of the casing 502 and integrating together a display panel 521 serving as a display section and an operating panel 522 serving as an input section. The casing 502 includes a speaker 531, a microphone 532, an operating section 540, and a camera section 541. Note that the configuration of the casing 502 is not limited thereto, and, for example, a configuration may be employed in which the display section and the input section are provided independently from each other, and a configuration including a folding structure or a sliding structure may also be employed.

Figure 28:
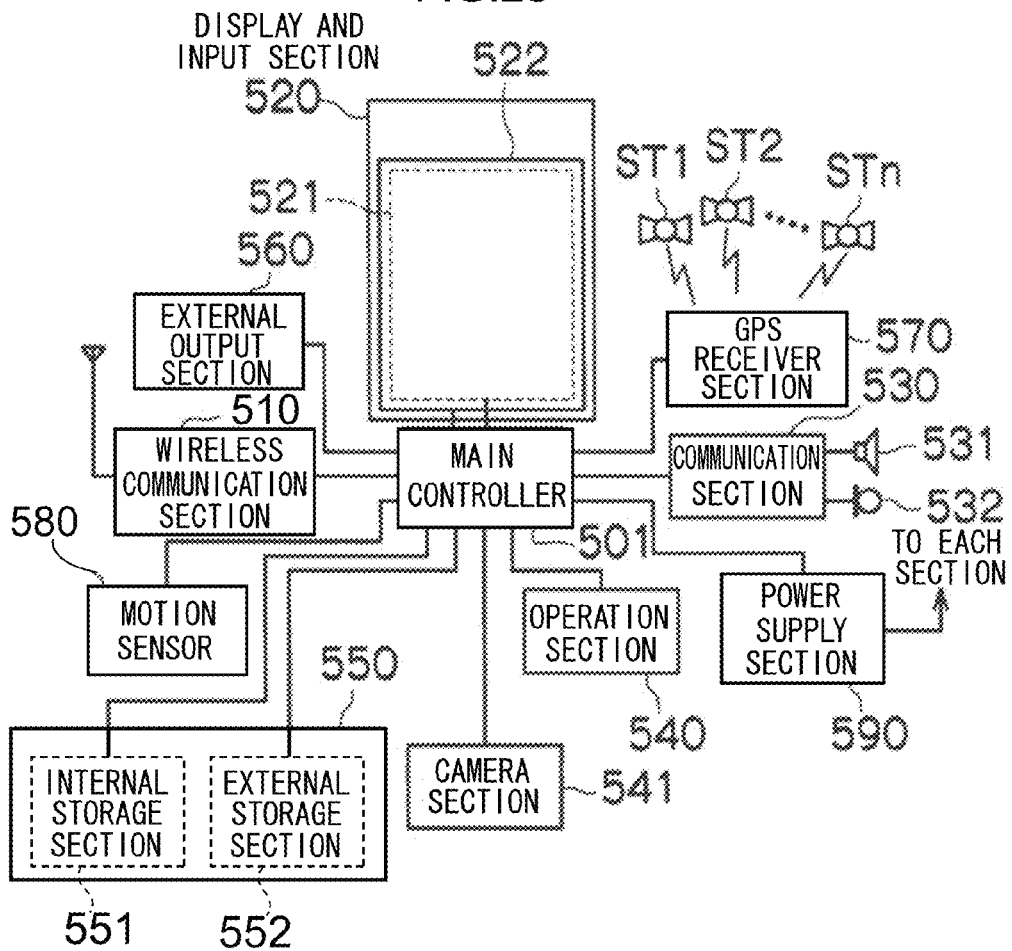
FIG. 28 is a block diagram illustrating an example of relevant configuration of an electrical system of a smartphone according to the second exemplary embodiment.

FIG. 28 is a block diagram illustrating an example of a configuration of the smartphone 500 illustrated in FIG. 27. As illustrated in FIG. 28, main configuration elements of the smartphone 500 include a wireless communication section 510, the display and input section 520, a telephone section 530, an operation section 540, a camera section 541, a storage section 550, and an external output section 560. Main configuration elements of the smartphone 500 also include a Global Positioning System (GPS) receiver section 570, a motion sensor 580, a power supply section 590, and a main controller 501. Main functions of the smartphone 500 include a wireless communication function that performs mobile wireless communication through a base station device BS and a mobile communication network NW.

The wireless communication section 510 performs wireless communication with the base station device BS installed in the mobile communication network NW according to instructions from the main controller 501. Transmission and reception of various types of file data, such as voice data and image data, email data etc., and reception of web data, streaming data, and the like is performed using the wireless communication.

The display and input section 520 is what is referred to as a touch panel, and includes the display panel 521 and the operation panel 522. Thus, according to control by the main controller 501, the display and input section 520 transmits information to a user visibly by displaying images (still images and video images), text data, and the like, and also detects user operation on the displayed information. The display panel 521 is preferably a 3D display panel in cases in which generated 3D is viewed.

The display panel 521 employs a display device such as an LCD, or an organic electro-luminescence display (OELD). The operation panel 522 is a device that is installed such that an image displayed on the display screen of the display panel 521 is visible, and detects one or plural coordinates operated by a user finger or stylus. A detection signal generated by operation when such a device is operated by a user finger or stylus is output to the main controller 501. The main controller 501 then detects the operation position (coordinates) on the display panel 521 based on the detection signal received.

As illustrated in FIG. 27, the display panel 521 and the operating panel 522 of the smartphone 500 are integrated together to configure the display and input section 520, and the operating panel 522 is disposed so as to entirely cover the display panel 521. In cases in which such a placement is adopted, the operating panel 522 may include a function to detect user operation even in a region outside of the display panel 521. In other words, the operating panel 522 may include a detection region for a superimposed section superimposed on the display panel 521 (referred to below as the display region), and a detection region for outer edge sections other than the above that are not superimposed on the display panel 521 (referred to below as the non-display region).

The size of the display region and the size of the display panel 521 may completely match each other, however they do not necessarily have to match each other. The operation panel 522 may include two sensitive regions, at an outer edge portion and at an inside portion other than the outer edge portion. The width of the outer edge section is appropriately designed according to the size of the casing 502 and the like. Moreover, as a position detection method employed in the operation panel 522, any of, for example, a matrix switch method, a resistance film method, a surface acoustic wave method, an infrared radiation method, an electromagnetic induction method, an electrostatic capacitance method, or the like may be adopted.

The communication section 530 includes the speaker 531 and the microphone 532. The communication section 530 converts user voice input through the microphone 532 into voice data capable of being processed by the main controller 501, then outputs this to the main controller 501. The telephone section 530 decodes voice data received by the wireless communication section 510 or by the external output section 560, and outputs the voice data from the speaker 531. As illustrated in FIG. 27, for example, the speaker 531 may be installed in the same face as the face at which the display and input section 520 is provided, and the microphone 532 may be installed in a side face of the casing 502.

The operation section 540 is a hardware key that employs a key switch or the like, and is a section that receives instructions from a user. For example, as illustrated in FIG. 27, the operation section 540 is installed to a side face of the casing 502 of the smartphone 500, and is a push-button type switch that is switched ON by depressing with a finger or the like, and is switched to an OFF state when the finger is removed by restoring force, such as from a spring.

The storage section 550 is stored with a control program and control data for the main controller 501, application software, address data that corresponds names against telephone numbers of contacts, and data of sent and received emails. The storage section 550 stores web data downloaded by web browsing, and downloaded content data. The storage section 550 also temporarily stores streaming data and the like. The storage section 550 includes an internal storage section 551 installed within the smartphone, and an external storage section 552 including a detachable-memory external slot. The internal storage section 551 and the external storage section 552 configuring the storage section 550 are implemented using a storage medium, such as a flash memory type or a hard disk type. Other examples that may be employed as the storage medium include a multimedia card micro type, a card type memory (such as a MICRO SD (registered trademark) memory or the like), Random Access Memory (RAM), or Read Only Memory (ROM).

The external output section 560 serves the role of an interface to all external devices coupled to the smartphone 500, and is employed to directly or indirectly connect to other external devices by communication or the like, or through a network. Examples of communication or the like with other external devices include, for example, a universal serial bus (USB), IEEE1394, or the like. Examples of networks include, for example, the internet, wireless LAN, BLUETOOTH (registered trademark), radio frequency identification (RFID), and infrared data association (IrDA: registered trademark) communication. Other examples of networks include ULTRA WIDEBAND (UWB: registered trademark), and ZIGBEE (registered trademark).

External devices coupled to the smartphone 500 include, for example, wired/wireless headsets, wired/wireless external chargers, a wired/wireless data port, and/or a memory card connected through a card socket. Other examples of external devices include a subscriber identity module (SIM) card, a user identity module (UIM) card, and an external audio/video device connected through an audio/video input/output (I/O) terminal. Examples of other external audio/video devices include wirelessly connected external audio/video devices. In place of an external audio/video device, for example, a wired/wirelessly connected smartphone, a wired/wirelessly connected personal computer, a wired/wirelessly connected PDA, a wired/wirelessly connected personal computer, or earphones or the like may also be applied.

The external input-output section is capable of transmitting received data that was transmitted by such external devices to each of the configuration elements within the smartphone 500, and capable of transmitting data within the smartphone 500 to the external devices.

Under instruction from the main controller 501, the GPS receiver section 570 receives GPS signals transmitted from GPS satellites ST1 to STn and executes position computation processing based on plural received GPS signals to detect the position in latitude, longitude, and altitude of the smartphone 500. The GPS receiver section 570 is also capable of detecting the position by using positional data when it is possible to acquire positional data from the wireless communication section 510 and the external output section 560 (such as a wireless LAN).

The motion sensor 580 includes, for example, a triaxial acceleration sensor, and detects physical movement of the smartphone 500 according to instruction from the main controller 501. The movement direction and acceleration of the smartphone 500 is detected by detecting the physical movement of the smartphone 500. The detection result is output to the main controller 501.

The power supply section 590 supplies electrical power accumulated in a battery (not illustrated in the drawings) to each of the sections of the smartphone 500 under instruction from the main controller 501.

The main controller 501 includes a microprocessor, and operates according to the control program and control data stored in the storage section 550 so as to integrally control each of the sections of the smartphone 500. In order to perform voice communication and data communication through the wireless communication section 510, the main controller 501 includes a mobile communication control function that controls each of the sections of the communication system, and an application processing function.

The application processing function is implemented by the main controller 501 operating according to application software stored in the storage section 550. Examples of application processing functions include an infrared communication function that controls the external output section 560 to perform data communication with a counterparty device, an email function that performs email transmission and reception, and a web browsing function that views web pages.

The main controller 501 includes an image processing function that displays a picture on the display and input section 520, or the like, based on image data (still image or video image data) such as received data or downloaded streaming data. The image processing function is a function in which the main controller 501 decodes the above image data, subjects the decoded result to image processing, and displays the image on the display and input section 520.

The main controller 501 also executes display control of the display panel 521, and operation detection control to detect user operation through the operation section 540, and the operation panel 522.

By executing display control the main controller 501 displays icons to startup application software, and software keys such as scroll bars, or displays windows to compose emails. Scroll bars are software keys to receive instructions to move the display portion of an image such as in large images that cannot be accommodated within the display region of the display panel 521.

By executing the operation detection control, the main controller 501 detects user operation through the operation section 540, and receives, through the operation panel 522, input of operations to the above icons, and input of character sequences to the entry field of the above window. By execution of the operation detection control, the main controller 501 receives scroll demands for display images through the scroll bar.

Moreover, by executing the operation detection control, the main controller 501 determines whether the operation position on the operation panel 522 is in the superimposed section that is superimposed on the display panel 521 (display region), or in the other outer edge section not superimposed on the display panel 521 (non-display region). It also includes a touch panel control function to receive the determination result, and to control sensitive regions of the operation panel 522 and the display position of the software key.

The main controller 501 detects gesture operations to the operation panel 522, and is capable of executing a preset function according to the detected gesture operation. Gesture operation does not mean a simple conventional touch operation, and means tracing a track with a finger or the like, specifying plural positions at the same time, and combinations thereof, and means an operation to trace a track of at least one of plural positions.

The camera section 541 is a digital camera that captures an image using an image pick-up device such as a CMOS or CCD, and includes functions similar to those of the imaging device 100 as illustrated in FIG. 1 and the like.

The camera section 541 is capable of switching between a manual focus mode and an automatic focus mode. When the manual focus mode has been selected, focusing of the imaging lens of the camera section 541 can be performed by operating a focus icon button or the like displayed on the operation section 540 or the display and input section 520. Then during manual focus mode, a live-view image combined with a split-image is displayed on the display panel 521, thereby enabling the focus state to be checked during manual focus. The HYBRID FINDER 220 illustrated in FIG. 7 may be provided to the smartphone 500.

The camera section 541, under control of the main controller 501, converts image data obtained by photography into, for example, compressed image data such as in joint photographic coding experts group (JPEG). Then the image data obtained by conversion can be stored in the storage section 550, and output through the external output section 560 and the wireless communication section 510. In the smartphone 500 illustrated in FIG. 27, the camera section 541 is installed to the same face as the display and input section 520; however the installation position of the camera section 541 is not limited thereto, and installation may be made to the back face of the display and input section 520, or plural of the camera sections 541 may be installed. In cases in which plural of the camera sections 541 are installed, image capture may be performed independently by switching the camera section 541 for image capture, or image capture may be performed using plural of the camera sections 541 at the same time.

The camera section 541 may also be utilized by various functions of the smartphone 500. For example, images acquired with the camera section 541 may be displayed on the display panel 521, and an image of the camera section 541 may be utilized as an operation input to the operation panel 522. During position detection by the GPS receiver section 570, the position may be detected with reference to an image from the camera section 541. Moreover, the optical axis direction of the camera section 541 of the smartphone 500 may be determined and the present usage environment may be determined by reference to an image from the camera section 541, either without using the triaxial acceleration sensor, or in combination with using the triaxial acceleration sensor. Obviously the image from the camera section 541 may be utilized in application software.

It is also possible for various data to be added to the image data of still images or video images and stored in the storage section 550, and output through the external output section 560 and the wireless communication section 510. Reference here to "various data" is, for example, to positional data acquired by the GPS receiver section 570 added to image data of still images or video images, and voice data acquired by the microphone 532 (which may be text data converted by speech to text conversion performed by the main controller or the like). It may moreover be orientation data or the like acquired by the motion sensor 580.

In each of the above exemplary embodiments, an example is given in which the image pick-up device 20 includes the first to third pixel groups, however the present invention is not limited thereto, and an image pick-up device configured from only a first pixel group and a second pixel group may be employed. A digital camera including such a type of image pick-up device is capable of generating a three dimensional image (3D image) based on the first image output from the first pixel group and the second image output from the second pixel group, and is also capable of generating a two dimensional image (2D image). In such cases, generation of the two dimensional image is, for example, performed by interpolation processing between pixels of the same color in each of the first image and the second image. The first image or the second image may also be employed as the two dimensional image without performing interpolation processing.

In each of the exemplary embodiments described above, examples have been explained in which the split-image is displayed within a display region of the normal image, however the present invention is not limited thereto, and the split-image (second display image) may be displayed on the display device without displaying the normal image (an example of the first display image). The split-image may also be displayed using the entire screen. An example that may be given of the "split-image" is cases in which an image pick-up device is employed configured from a phase difference pixels group alone (for example the first pixel group and the second pixel group), and cases in which an image pick-up device is employed with phase difference pixels (for example the first pixel group and the second pixel group) placed at a specific proportion with respect to the normal pixels and a split-image is based on images output from the phase difference pixel groups (for example the first image output from the first pixel group and the second image output from the second pixel group). Thus in the present invention, there is no limitation to a display mode that displays both the normal image and the split-image at the same time on the same screen of the display device, and the display controller 36 may perform control so as to display the split-image without displaying the normal image on the display device in cases in which an instruction to display the normal image is removed in a state in which display of the split-image is being instructed.

The invnetion claimed is:

1. An image processing device comprising:
an image acquisition section that acquires a first image and a second image based on a first image signal and a second image signal output respectively from a first pixel group and a second pixel group that output the first image signal and the second image signal and on which a subject image is formed after passing through a first region and a second region in an imaging lens so as to be pupil-divided;
a parallax computation section that computes a parallax representing a displacement amount between each of the pixels of the first image and the corresponding pixels of the second image acquired by the image acquisition section;
a first determination section that determines whether or not a target pixel for image processing is within a first parallax range satisfying a specific condition;
a coefficient decision section that, for each of the target pixels in the first image and the second image acquired by the image acquisition section, determines a parallax conversion coefficient to convert the parallax computed by the parallax computation section into a parallax by which it is visually confirmable that the first image and the second image are within the first parallax range in cases determined by the first determination section to be within the first parallax range, and that determines a parallax conversion coefficient to convert the parallax computed by the parallax computation section into a parallax by which it is visually confirmable that the first image and the second image are outside the first parallax range in cases determined by the first determination section to be outside the first parallax range;
an image processing section that performs image processing on the target pixels based on the parallax conversion coefficient determined by the coefficient decision section;
a generation section that generates a first display image based on an image signal output from an image pick-up device including the first pixel group and the second pixel group, and generates a second display image for use in focus verification based on an image in which the image processing has been performed on the respective target pixels in the first image and the second image;
a display section that displays images; and
a display controller that controls the display section so as to display the first display image generated by the generation section and to display the second display image generated by the generation section in a display region of the first display image.

2. The image processing device of claim 1, wherein the first determination section determines whether or not the target pixel is within the first parallax range according to the following Equation (1)

$$Pe < \kappa \times (We/Wc)$$ Equation (1)

wherein:
Wc is the number of pixels in the parallax generation direction of the image pick-up device including the first pixel group and the second pixel group;
We is the number of pixels in the parallax generation direction of an output destination of an image obtained by performing the image processing;
κ is a coefficient less than 1 that decreases as at least one out of sensitivity of the image pick-up device or aperture number of the imaging lens increases; and
Pe is a parallax within the first parallax range.

3. The image processing device of claim 1, further comprising a second determination section that determines whether or not the parallax computed by the parallax computation section is within a second parallax range wider than the first parallax range,
wherein the parallax conversion coefficient is a parallax conversion coefficient that expands the parallax computed by the parallax computation section in cases in which the parallax computed by the parallax computation section is determined by the second determination section to be within the second parallax range.

4. The image processing device of claim 1, wherein the parallax conversion coefficient is defined by a continuous function having an input of the parallax computed by the parallax computation section, and selectively outputting the parallax by which it is visually confirmable that the first image and the second image are within the first parallax range, or the parallax by which it is visually confirmable that the first image and the second image are outside the first parallax range.

5. The image processing device of claim 4, wherein the continuous function is a first linear function in a range of the parallax computed by the parallax computation section in cases determined by the first determination section to be within the first parallax range.

6. The image processing device of claim 5, wherein the continuous function is a second linear function contiguous to the first linear function and having a shallower gradient than the first linear function in a range of the parallax computed by the parallax computation section in cases determined by the first determination section to be outside the first parallax range.

7. The image processing device of claim 6, wherein the continuous function is the second linear function and an identity function contiguous to the second linear function in a range of the parallax computed by the parallax computation section in cases determined by the first determination section to be outside the first parallax range.

8. The image processing device of claim 1, wherein the parallax conversion coefficient is determined according to the type of viewing medium for viewing the image obtained by performing image processing.

9. The image processing device of claim 1, wherein the first parallax range is made narrower as an aperture number of the imaging lens becomes higher.

10. The image processing device of claim 9, wherein the image acquisition section:
further acquires a successive frame image captured with successive frames, and also acquires a single frame image captured in cases in which single frame image capture has been instructed; and
sets the first parallax range narrower as an aperture number of the imaging lens becomes higher in cases in which capture of the single frame image has not been instructed.

11. The image processing device of claim 10, wherein the first parallax range is determined according to an aperture number to be used in single frame image capture in cases in which the single frame image capture has been instructed.

12. The image processing device of claim 11, wherein in cases in which the single frame image capture has been instructed, the first parallax range is made wider in cases in which the aperture value when instructed to capture the single frame image is higher than the aperture value employed to capture the successive frame image, and is made narrower in cases in which the aperture value when instructed to capture the single frame image is lower than the aperture value employed to capture the successive frame image.

13. The image processing device of claim 1, wherein the second display image is a split-image corresponding to an image displaced along the parallax generation direction by a displacement amount according to the parallax between the first image and the second image after conversion by the parallax conversion coefficient.

14. The image processing device of claim 1, wherein the parallax visually confirmable to be within the first parallax range is parallax evaluated to be in a focused state by a predetermined number of persons or above from a plurality of test subjects who visually check in advance each of a plurality of test images with different parallaxes.

15. The image processing device of claim 1, wherein the parallax visually confirmable to be outside the first parallax range is parallax evaluated to be in a non-focused state by a predetermined number of persons or above from a plurality of test subjects who visually check in advance each of a plurality of test images with different parallaxes.

16. The image processing device of claim 1, wherein:
the image pick-up device includes a third pixel group on which a subject image is formed as a non-pupil-divided image to output a third image signal; and
the generation section generates the first display image based on the third image signal output from the third pixel group.

17. An imaging device comprising:
the image processing device of claim 1; and
a storage section that stores images obtained by performing image processing.

18. The imaging device of claim 17, further comprising:
an electronic viewfinder that displays images obtained by the image processing; and
a detection section that detects use of the electronic viewfinder,
wherein the coefficient decision section selects an in-use parallax conversion coefficient predetermined as the parallax conversion coefficient to be employed during use of the electronic viewfinder in cases in which use of the electronic viewfinder has been detected by the detection section, and selects a non-use parallax conversion coefficient predetermined as the parallax conversion coefficient to be employed during non-use of the electronic viewfinder in cases in which use of the electronic viewfinder has not been detected by the detection section.

19. The imaging device of claim 18, wherein, in cases of displaying an image on which the image processing has been performed in a display region with a number of pixels in a parallax generation direction different from the number of pixels in the parallax generation direction of the electronic viewfinder, the non-use parallax conversion coefficient is set to a display region-use coefficient predetermined as the parallax conversion coefficient to be employed during use of the display region.

20. The image device of claim 19, wherein:
the number of pixels in the parallax generation direction of the display region is more than the number of pixels in the parallax generation direction of the electronic viewfinder; and
a range of parallax after conversion by the display region-use coefficient is made narrower for target pixels determined by the first determination section to be within the first parallax range.

21. An image processing method comprising:
an image acquisition step that acquires a first image and a second image based on a first image signal and a second image signal output respectively from a first pixel group and a second pixel group that output the first image signal and the second image signal and on which a subject image is formed after passing through a first region and a second region in an imaging lens so as to be pupil-divided;
a parallax computation step that computes a parallax representing a displacement amount between each of the pixels of the first image and the corresponding pixels of the second image acquired by the image acquisition step;
a first determination step that determines whether or not a target pixel for image processing is within a first parallax range satisfying a specific condition;
a coefficient decision step that, for each of the target pixels in the first image and the second image acquired by the image acquisition step, determines a parallax conversion coefficient to convert the parallax computed by the parallax computation step into a parallax by which it is visually confirmable that the first image and the second image are within the first parallax range in cases determined by the first determination step to be within the first parallax range, and that determines a parallax conversion coefficient to convert the parallax computed by the parallax computation step into a parallax by which it is visually confirmable that the first image and the second image are outside the first parallax range in cases determined by the first determination step to be outside the first parallax range;
an image processing step that performs image processing on the target pixels based on the parallax conversion coefficient decided by the coefficient decision step;
a generation step that generates a first display image based on an image signal output from an image pick-up device including the first pixel group and the second pixel group, and generates a second display image for use in focus verification based on an image in which the image processing has been performed on each of the target pixels in the first image and the second image;
a display step that displays images; and
a display control step that controls a display section for displaying images so as to display the first display image generated by the generation step, and to display the second display image generated by the generation step in a display region of the first display image.

22. A non-transitory computer-readable storage medium storing a program for causing a computer to function as:
the image acquisition section, the first determination section, the coefficient decision section, the image processing section, the generation section, and the display controller of the image processing device of claim 1.

* * * * *